(12) United States Patent
Maruyama et al.

(10) Patent No.: US 10,554,832 B2
(45) Date of Patent: Feb. 4, 2020

(54) ROLLER, SEPARATION DEVICE, IMAGE READING APPARATUS, AND RECORDING APPARATUS

(71) Applicant: SEIKO EPSON CORPORATION, Tokyo (JP)

(72) Inventors: Hidenobu Maruyama, Azumino (JP); Kenta Anegawa, Matsumoto (JP); Hidehito Okuhara, Shiojiri (JP); Takashi Kawabata, Shiojiri (JP); Naohiro Daito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/951,520

(22) Filed: Apr. 12, 2018

(65) Prior Publication Data
US 2018/0297797 A1 Oct. 18, 2018

(30) Foreign Application Priority Data

Apr. 13, 2017 (JP) .................................. 2017-079505
Apr. 13, 2017 (JP) .................................. 2017-079506

(51) Int. Cl.
*B65H 27/00* (2006.01)
*H04N 1/00* (2006.01)
(Continued)

(52) U.S. Cl.
CPC ....... *H04N 1/00602* (2013.01); *B65H 3/0638* (2013.01); *B65H 3/0669* (2013.01); *B65H 3/5284* (2013.01); *B65H 5/06* (2013.01); *B65H 27/00* (2013.01); *B65H 29/14* (2013.01); *B65H 29/20* (2013.01); *H04N 1/121* (2013.01); *B65H 2401/111* (2013.01); *B65H 2402/35* (2013.01);
(Continued)

(58) Field of Classification Search
CPC ............ B65H 3/0638; B65H 2404/117; B65H 2404/1122; B65H 2404/11; B65H 27/00
USPC ........................................................ 347/104
See application file for complete search history.

(56) References Cited

U.S. PATENT DOCUMENTS 8,061,398 B2 * 11/2011 Palinkas .................. B60C 7/12
152/323
2003/0218293 A1 11/2003 Mizuno et al.
(Continued)

FOREIGN PATENT DOCUMENTS

JP     S61206767 A    9/1986
JP     62-224719 A    10/1997
(Continued)

*Primary Examiner* — Howard J Sanders
(74) *Attorney, Agent, or Firm* — Workman Nydegger

(57) ABSTRACT

There is provided a roller including: a shaft, and an elastic body portion that is provided on an outer peripheral surface of the shaft, in which the elastic body portion includes a plurality of first recessed portions which are provided on one side of the roller in a shaft mounting direction at intervals in a circumferential direction of the roller and each have a bottom portion, and a plurality of second recessed portions which are provided on the other side of the roller in the shaft mounting direction at intervals in the circumferential direction of the roller and each have a bottom portion, and in which each of the first recessed portions is positioned between the adjacent second recessed portions in the circumferential direction of the roller in the side view of the roller in the shaft mounting direction.

20 Claims, 15 Drawing Sheets

(51) Int. Cl.
    *B65H 3/06*     (2006.01)
    *B65H 3/52*     (2006.01)
    *B65H 5/06*     (2006.01)
    *B65H 29/14*     (2006.01)
    *B65H 29/20*     (2006.01)
    *H04N 1/12*     (2006.01)

(52) U.S. Cl.
    CPC ...... *B65H 2402/80* (2013.01); *B65H 2404/11* (2013.01); *B65H 2404/111* (2013.01); *B65H 2404/117* (2013.01); *B65H 2404/1122* (2013.01); *B65H 2404/147* (2013.01); *B65H 2404/1431* (2013.01); *B65H 2404/18* (2013.01); *B65H 2404/181* (2013.01); *B65H 2801/06* (2013.01); *B65H 2801/15* (2013.01); *B65H 2801/39* (2013.01)

(56) References Cited

U.S. PATENT DOCUMENTS

| | | | |
|---|---|---|---|
| 2017/0225916 A1 | 8/2017 | Tsuda et al. | |
| 2018/0302523 A1* | 10/2018 | Maruyama | B65H 3/5284 |

FOREIGN PATENT DOCUMENTS

| | | | |
|---|---|---|---|
| JP | 4090362 B | 12/2003 |
| JP | 2006-001656 A | 1/2006 |
| JP | 2008-241739 A | 10/2008 |
| JP | 4593389 B | 9/2010 |
| JP | 5449272 B | 1/2014 |
| JP | 2016-175710 A | 10/2016 |
| JP | 6094913 B | 8/2017 |
| JP | 6094919 B | 8/2017 |

\* cited by examiner

ROLLER, SEPARATION DEVICE, IMAGE READING APPARATUS, AND RECORDING APPARATUS

BACKGROUND

1. Technical Field

The present invention relates to a roller used for transporting, or the like a medium such as a paper, a separation device including the roller, an image reading apparatus such as a scanner, and a recording apparatus.

2. Related Art

In order to secure a transport performance for various media, when a surface of a roller is in contact with a surface of the medium and transports the medium, it is desirable that these kinds of rollers are elastically slightly crushed on a surface thereof which is brought into contact therewith and the contact area between a contact surface of the medium and the surface of the roller increases. In the related art, the crush is realized using a foamed rubber material as a material for the roller.

In addition to the foamed rubber material, an elastomer is used to realize the crush (JP-A-2008-241739 or the like).

However, in order to secure the transport performance of the roller by the foamed rubber material, a high-quality material is required, resulting in a problem of high cost. In addition, cracks are likely to be generated from the foamed portion as a starting point over time, and when repeated deformation is added, it is difficult for the shape thereof to be returned to the original shape thereof, resulting in a problem that the durability of the roller is lowered.

In a roller using an elastomer other than the foamed rubber material, although there is no problem that cracks are likely to be generated from a foamed portion such as a foamed rubber material as a starting point, since the elastomer generally has a rubber hardness higher than that of a foamed rubber material, in order to secure the transport performance of the roller due to the crush, it is difficult to select a proper material and degrees of freedom of selection is lowered. As a result, there is a problem of high cost.

In addition, there are the following problems from the manufacturing aspect of the roller.

Generally, the roller is manufactured by pouring a raw material into a mold and filling the mold with the raw material, as in insert molding or the like. In the insert molding or the like, although it is necessary to secure fluidity when pouring and filling the mold with the raw material thereof, even in a structure in which the roller penetrates from one side surface to the other side surface in the axial direction thereof, it is difficult to secure the fluidity and the time required for completion of filling is likely to be long. Therefore, heat history at the time of curing the raw material is likely to be changed according to locations, and there is a problem that a shape accuracy of an outer peripheral surface of the roller as the final molded product is likely to be reduced.

SUMMARY

An advantage of some aspects of the invention is to structurally realize crush of a surface at the time of transporting for securing a transport performance of a roller, not by selection of materials. In addition, even in a case where the roller is manufactured by pouring and filling a mold with the raw material as in insert molding or the like, the reduction of a shape accuracy of an outer peripheral surface of the roller as the final molded product can be easily suppressed.

According to an aspect of the invention, there is provided a roller including: a shaft, and an elastic body portion that is provided on an outer peripheral surface of the shaft, in which the elastic body portion has a plurality of first recessed portions which are provided on a first side portion of one side of the roller in a shaft mounting direction at intervals in a circumferential direction of the roller and each have a bottom portion, and a plurality of second recessed portions which are provided on a second side portion of the other side of the roller in the shaft mounting direction at intervals in the circumferential direction of the roller and each have a bottom portion, and in which each of the first recessed portions is positioned between the adjacent second recessed portions in the circumferential direction of the roller in a side view of the roller in the shaft mounting direction.

According to this configuration, the elastic body portion of the roller includes a plurality of first recessed portions and a plurality of second recessed portions, in which the directions of the recessions are opposite to each other with respect to the shaft mounting direction of the roller, and the plurality of first recessed portions and the plurality of second recessed portions are configured to be alternately positioned in parallel in the peripheral direction. By the "opposite direction to shaft mounting direction" and "to be alternately positioned in peripheral direction" structure, the elastic body portion is crushed in a well-balanced manner and the contact area thereof can be increased, when the roller is pressed against a medium such as paper to exert a transporting action to the medium. Even if the elastic body portion is made using a material having a high rubber hardness, by the "opposite direction to shaft mounting direction" and "to be "alternately positioned in peripheral direction" structure, the elastic body portion is easily crushed and the contact area thereof can be increased.

Therefore, crush of a surface can be structurally easily realized at the time of transport for securing the transport performance of the rollers not by selection of materials.

In addition, in a case where the roller is manufactured by insert molding or the like, since each of the first recessed portions has the bottom portion and each of the second recessed portions also has the bottom portion, as compared with "penetrating structure" having no such bottom portion, fluidity of a raw material is likely to be secured. Accordingly, reduction of the shape accuracy of the outer peripheral surface of the roller as the final molded particle can be suppressed.

In the roller, each of the first recessed portions and each of the second recessed portions may be formed so as to be symmetrical with respect to a center plane orthogonal to the shaft mounting direction.

According to this configuration, since each of the first recessed portions and each of the second recessed portions are formed so as to be symmetrical with respect to the center plane orthogonal to the shaft mounting direction and furthermore, the symmetric structure becomes the opposite structure in the adjacent peripheral direction, the crush can be realized in a more well-balanced manner when the pressing force is applied to the roller.

In the roller, a constituent material of the elastic body portion may be a non-foamed material.

In this configuration, since the constituent material of the elastic body portion is a non-foamed material, there is no problem that a crack is generated over time from the foamed portion as a starting point.

In the roller, the elastic body portion may include an inner layer portion which becomes a shaft side, and an outer layer portion which becomes a side which is in contact with a medium, and the inner layer portion may include the first recessed portions and the second recessed portions.

In this configuration, the elastic body portion of the roller can also be applied to a two-layered structure and the effect described above can be obtained.

In addition, in the two-layered structure, when the fluidity of the raw material is lowered at the time of manufacturing by insert molding or the like, although the problem that the shape accuracy of the outer layer portion of the roller as the final molded product is likely to be lowered is likely to be generated, in this configuration, since the fluidity can be improved by the bottom portion, generation of the problem can be suppressed.

In the roller, the first recessed portions may include first group first recessed portions which are positioned on a first circumference, and second group first recessed portions which are positioned on a second circumference different from the first circumference, and the second recessed portions may include first group second recessed portions which are positioned on the first circumference and second group second recessed portions which are positioned on the second circumference.

According to this configuration, each of the first recessed portions includes the first group first recessed portion which is positioned on the first circumference and the second group first recessed portion which is positioned on the second circumference and is configured to have a double structure in the radial direction. Further, similarly to each of the first recessed portions, each of the second recessed portions includes the first group second recessed portion and the second group second recessed portion and is configured to have a double structure in the radial direction. By this double structure, when the roller is pressed against a medium such as paper to exert a transporting action, the elastic body portion can be crushed in a well-balanced manner.

A triple structure, a quadruple structure or the like may further be provided, which further includes a third group first recessed portion and a third group second recessed portion on a third circumference different from the first circumference and the second circumference.

In the roller, each of the first group first recessed portions and each of the second group first recessed portions may be positioned in a circumferential direction of the roller so that portions thereof are overlapped each other.

According to this configuration, the crush can be more easily realized by the overlapping of the double structure.

In the roller, each of the first recessed portions and each of the second recessed portions may have shapes in which peripheral direction components and radial direction components thereof are connected to each other in a side view of the roller in the shaft mounting direction.

According to this configuration, since each of the first recessed portions and each of the second recessed portions have a shape in which the peripheral direction component and the radial direction component of the roller are connected to each other in a side view in the shaft mounting direction, the crush can be stably realized.

According to another aspect of the invention, there is provided a separation device including: a feeding roller, and a retard roller that forms a pair with the feeding roller, separates media other than a medium to be transported from a bundle of media, and returns the media to the upstream side thereof, in which the retard roller is a roller described above.

According to this configuration, when the retard roller is pressed against a medium such as paper to exert a transporting action, the elastic body portion can be crushed in a well-balanced manner, and thus an effective separation device can be realized.

According to still another aspect of the invention, there is provided an image reading apparatus including: a reading portion that reads image information of a medium, and a roller that is provided in a medium transport path which passes through a reading execution region of the reading portion and that applies a feeding force to the medium, in which the roller has a structure in which a contact surface between the roller and the medium is elastically crushed when pressed against the medium, and at least one of the rollers is the roller described above.

In this configuration, the effects described above can be obtained as the image reading apparatus such as a scanner.

According to still another aspect of the invention, there is provided a recording apparatus including: a recording portion, and a roller that is provided in a medium transport path which passes through a recording execution region of the recording portion and that applies a feeding force to a medium, in which the roller has a structure in which a contact surface between the roller and the medium is elastically crushed when the roller is pressed against the medium, and at least one of the rollers is the roller described above.

In this configuration, the effects described above can be obtained as the reading apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First, as an image reading apparatus of the invention, using an example of the continuous automatic feeding type image scanner according to Embodiment 1 illustrated in FIGS. 1 and 2, an outline of the overall configuration of the image reading apparatus and a configuration of a medium transport path will be explained. Next, as a separation device of the invention, using an example of a separation device according to Embodiment 2 illustrated in FIG. 3 mounted on the image reading apparatus, a configuration of the separation device and an outline of a separation action thereof will be explained.

Next, using an example of a roller according to Embodiment 3 illustrated in FIGS. 4 to 18, which can be applied to a retard roller of the separation device, a configuration of the roller of the invention and molding and an action thereof will be specifically described. Furthermore, by picking a roller having a somewhat different configuration from the roller according to the Embodiment 3 as a roller according to Embodiment 4 of the invention, a structure of the roller and an action thereof will be described focusing on the differences from Embodiment 3.

Finally, a configuration of a roller according to another embodiment of the invention, which is different in configuration from Embodiments 3 and 4 and an embodiment in which the roller of the invention is applied to the recording apparatus will be described.

Embodiment 1

Figure 1:
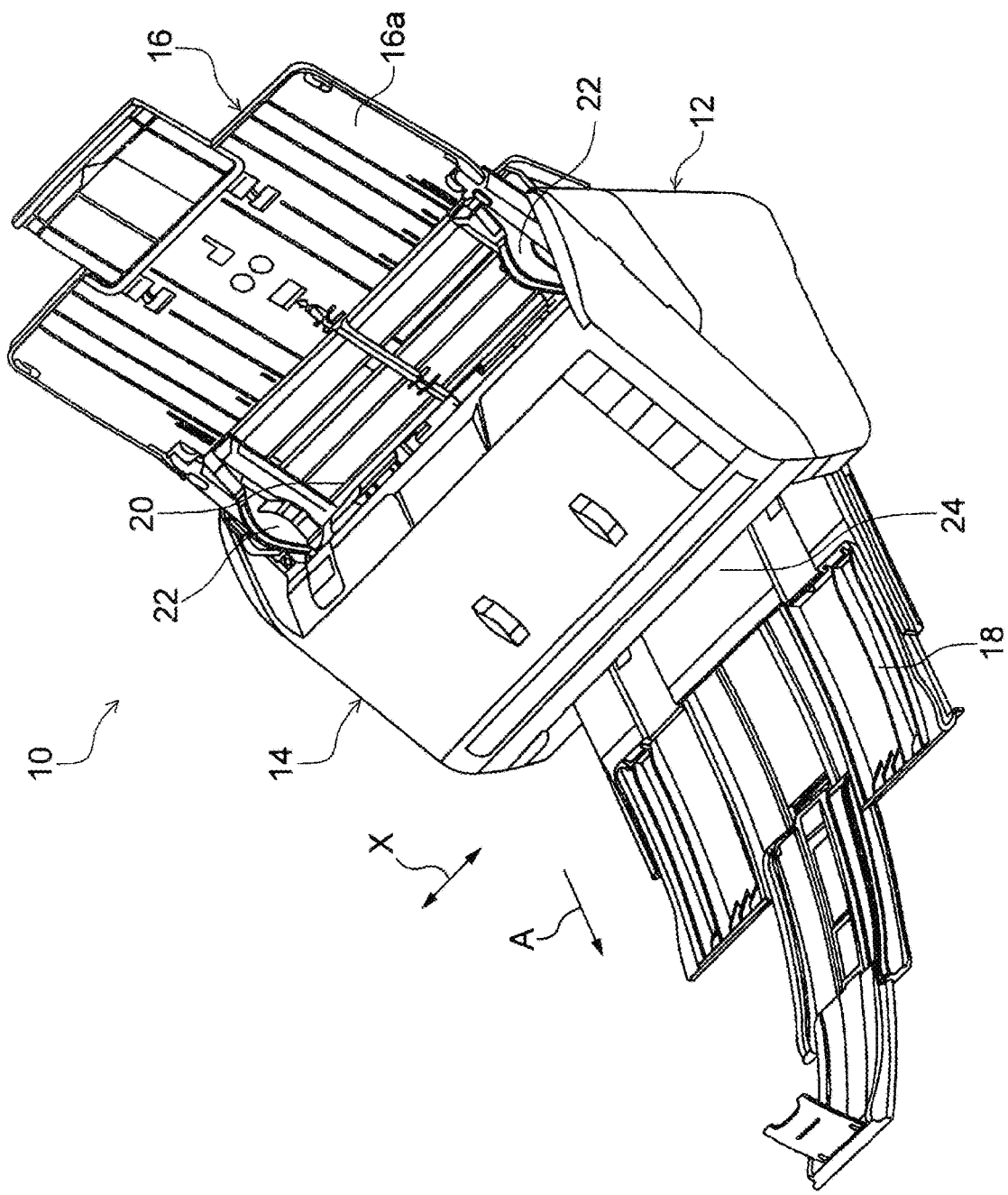
FIG. 1 is a perspective view illustrating an outer appearance of an image reading apparatus according to Embodiment 1 of the invention.
Figure 2:
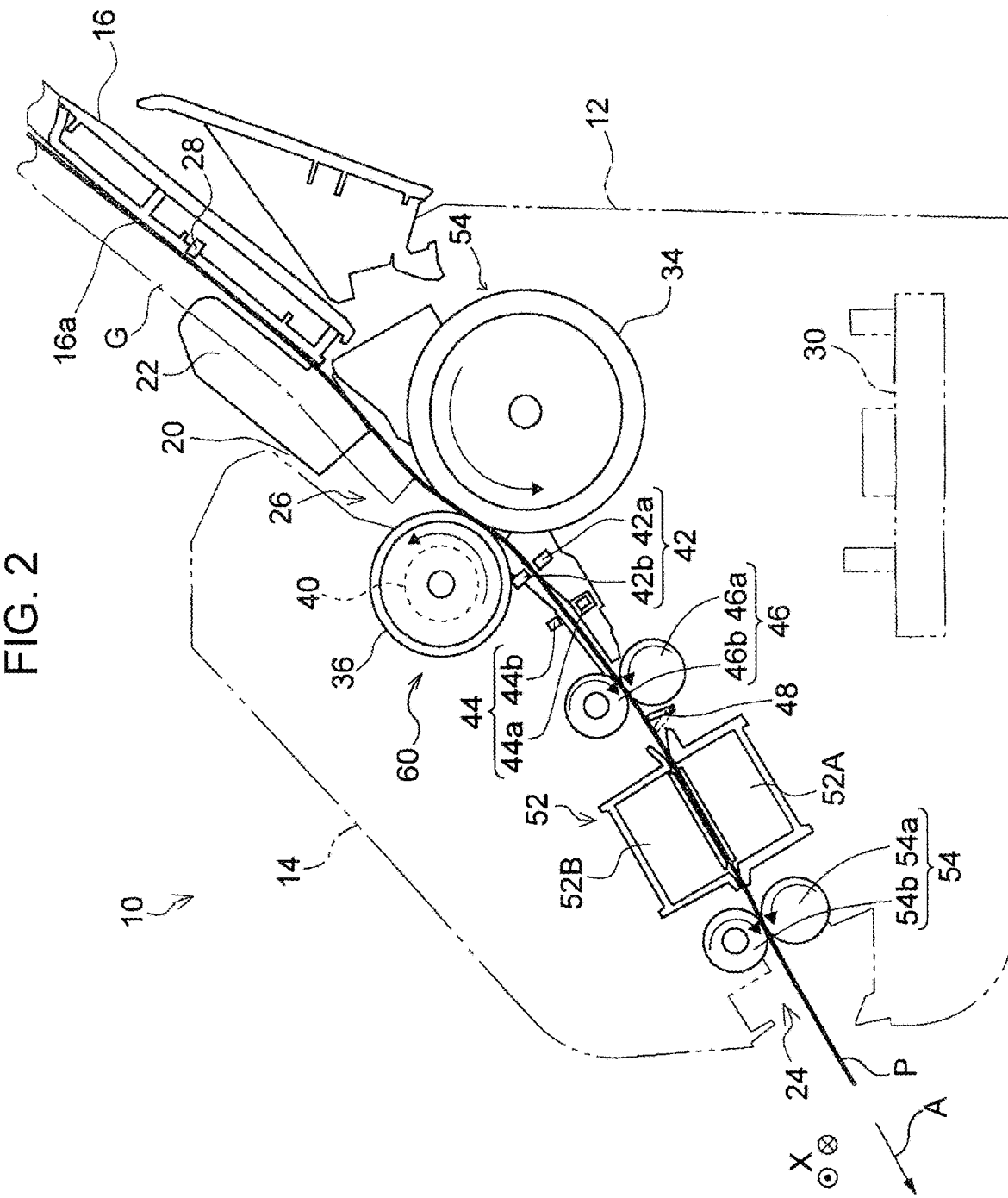
FIG. 2 is a cross-sectional view of a main portion illustrating the image reading apparatus according to Embodiment 1 of the invention.

(1) Outline of Overall Configuration of Image Reading Apparatus (See FIGS. 1 and 2)

The illustrated image reading apparatus 10 includes a lower unit 12, an upper unit 14, a cover portion 16, and a discharge tray 18. In addition, although not illustrated, the upper unit 14 has a rotation supporting point at an end portion on the downstream side in the medium transport direction A of the lower unit 12, and is rotatably attached to the lower unit 12 via the rotation supporting point.

In addition, although not illustrated, on an upper portion of a rear surface side of the lower unit 12, the same rotation supporting point is also provided, and the cover portion 16 is rotatably attached to the lower unit 12 via the rotation supporting point. The cover portion 16 can take a non-feeding state (not illustrated) of covering the upper portion of the upper unit 14 and the feeding port 20 and a feedable state of opening the feeding port 20 by rotating to the rear surface side of the device as illustrated in FIG. 1. Then, when the cover portion 16 is in a feedable state as illustrated in FIG. 1, the back surface of the cover portion 16 is exposed and functions as a medium mounting portion 16a on which the medium P is mounted.

In addition, a discharge port 24 for discharging the medium P is provided on the front surface side of the device of the lower unit 12. In addition, the lower unit 12 includes a discharge tray 18 that can be drawn out from the discharge port 24 toward the front surface side of the device. The discharge tray 18 is attached to the lower unit 12 so as to be capable of taking a state (not illustrated) of being accommodated in a bottom portion of the lower unit 12 and a state (see FIG. 1) of being drawn to the front surface side of the device. In addition, the discharge tray 18 is configured by connecting a plurality of tray members, and the drawing length from the discharge port 24 can be adjusted with respect to the size of the medium P to be discharged.

(2) Configuration of Medium Transport Path in Image Reading Apparatus

Next, a configuration of a medium transport path 26 in the image reading apparatus 10 will be described with reference to FIG. 2. In FIG. 2, only the outer shells of the lower unit 12 and the upper unit 14 are illustrated by virtual lines. In addition, in FIG. 2, the bold solid line denoted by reference symbol P indicates a trajectory of the transport of the medium P transported along the medium transport path 26 in the image reading apparatus 10. The multi-fed medium P which is not illustrated is configured so as to be separated by the separation device 60, which will be described below, and be separated from the medium P transported toward the reading portion 52 and remain at a separation position.

The bundle G of the medium whose leading end is inserted into the feeding port 20 is set in a state of being supported by the medium mounting portion 16a described above as indicated by a one-dot chain line in FIG. 2. In addition, a mounting portion detection sensor 28 is provided on the medium mounting portion 16a. The mounting portion detection sensor 28 is configured with a contact type sensor having a lever or the like, an optical non-contact type sensor, or the like, as an example and when the medium P is set on the medium mounting portion 16a, the mounting portion detection sensor 28 transmits the detection signal thereof to the control unit 30 indicated by a virtual line in FIG. 2.

In addition, as illustrated in FIG. 1, a pair of edge guides 22 is provided on the medium mounting portion 16a. The edge guides 22 are configured to be movable in mutually approaching directions and in mutually spaced directions in the device width direction X. When the medium P is set on the medium mounting portion 16a, the guide surface of the edge guide 22 is configured so that the guide surface is in contact with the left and right side portions of the medium P in the device width direction X, and the position of the medium P in the device width direction X is restricted, and the feeding of the medium P to the reading portion 52 is guided. The edge guide 22 in FIG. 1 indicates a state where it is most distant in the device width direction X, that is, in the width direction of the medium P.

The medium P located at the lowermost position among the bundle G of the medium set on the medium mounting portion 16a is fed toward the downstream side in the medium transport direction A by a feeding roller 34 driven to rotate by a feeding driving motor (not illustrated). Although not illustrated, two feeding rollers 34 are provided at an interval in the device width direction X as an example. In addition, an outer peripheral surface of the feeding roller 34 is configured to be made of a high friction material (for example, synthetic rubber, elastomer, or the like).

In addition, in FIG. 2, the leading end of the bundle of documents indicated by reference symbol G is held at the feed waiting position illustrated in FIG. 2 by a stopper (not illustrated) before feeding start and entrance thereof between the feeding roller 34 and a retard roller 36 to be described below is restricted.

In addition, a retard roller 36, which is a constituent member of the separation device 60 described below, is provided together with the feeding roller 34 at a position facing the feeding roller 34. As with the feeding roller 34, two retard rollers 36 are also provided in the device width direction X as an example. The retard roller 36 is provided in a state of being urged toward the feeding roller 34 by urging means (not illustrated).

In addition, the retard roller 36 is configured to be driven to rotate in a direction C opposite to the rotation direction B of the feeding roller 34 by a transport driving motor (not illustrated), a torque limiter 40 is provided on the retard roller 36, and via the torque limiter 40, the retard roller 36 is configured to receive a driving torque of a transport driving motor (not illustrated).

A first medium detection sensor 42 for detecting the feeding of the medium P is provided at a downstream position of the feeding roller 34 and the retard roller 36 in the medium transport path 26. Although not illustrated, the first medium detection sensor 42 is disposed as an example within the transport region of the maximum size medium P that can be fed in the device width direction X of the medium transport path 26. The first medium detection sensor 42 is configured as an example by an optically non-contact type sensor including a light emitting unit 42a and a light receiving unit 42b which are disposed at positions facing each other with the medium transport path 26 interposed therebetween. When the medium P is transported to the medium transport path 26, the medium P blocks the detection light from the light emitting unit 42a, so that feeding of the medium P is detected and the detection signal is transmitted to the control unit 30.

On the downstream side of the first medium detection sensor 42 in the medium transport direction A in the medium transport path 26, a multi-feed detection sensor 44 for detecting multi-feeding of the medium P is disposed in the medium transport region in the device width direction X, as an example. The multi-feed detection sensor 44 includes a speaker portion 44a and a microphone portion 44b and is configured to oscillate an ultrasonic wave from the speaker portion 44a toward the medium P passing through the medium transport path 26 and to detect reflected sound from the medium P by the microphone portion 44b. In addition, in the present embodiment, the multi-feed detection sensor 44 is configured to be capable of detecting not only the multi-feeding of the medium P but also the type of the medium P such as the thickness of the medium P, based on the frequency of reflected sound.

At the downstream position of the multi-feed detection sensor 44 in the medium transport direction A in the medium transport path 26, a transport roller pair 46 is provided, which is configured with a transport driving roller 46a and a transport driven roller 46b. In addition, a second medium detection sensor 48 configured with a contact type sensor having a lever is provided at a downstream position of the transport roller pair 46 in the medium transport direction A, as an example.

At the downstream position of the second medium detection sensor 48 in the medium transport direction A, there is provided a reading portion 52 that reads the image expressed on the medium P as image information. The reading portion 52 includes a first reading unit 52A provided to the lower unit 12 so as to face a first surface that is a lower surface of the medium P transported along the medium transport path 26, and a second reading unit 52B provided in the upper unit 14 so as to face a second surface that is an upper surface of the medium P to be transported along a medium transport path 26. The first reading unit 52A and the second reading unit 52B are configured as a contact type image sensor module (CISM) as an example.

The medium P from which the image represented on at least one of the first surface and the second surface is read by the reading portion 52 is transported to a discharge roller pair 54 positioned at the downstream position of the reading portion 52 in the medium transport direction A. The discharge roller pair 54 is configured by including a discharge driving roller 54a and a discharge driven roller 54b, and the medium P is nipped by the discharge roller pair 54 configured as described above and discharged from the discharge port 24 to the outside.

The transport driving roller 46a of the transport roller pair 46 and the discharge driving roller 54a of the discharge roller pair 54 may be driven so as to rotate using a single motor as a common drive source, or may be rotationally driven separately using separate motors.

The image reading apparatus 10 according to the embodiment of the invention includes the reading portion 52 described above that reads image information of the medium P, and the various rollers 34, 36, 46, 54, and the like described above that apply a feeding force to a medium P provided in the medium transport path 26 that passes through the reading execution region of the reading portion 52. These rollers 34, 36, 46, 54, and the like have a structure in which the contact surface S is elastically crushed when pressed against the medium P.

At least one of these rollers 34, 36, 46, 54 and the like is configured with the roller 1 of the embodiment according to the invention which will be described below. In the present embodiment, the retard roller 36 is configured by the roller 1 according to the embodiment of the invention.

Embodiment 2

Figure 3:
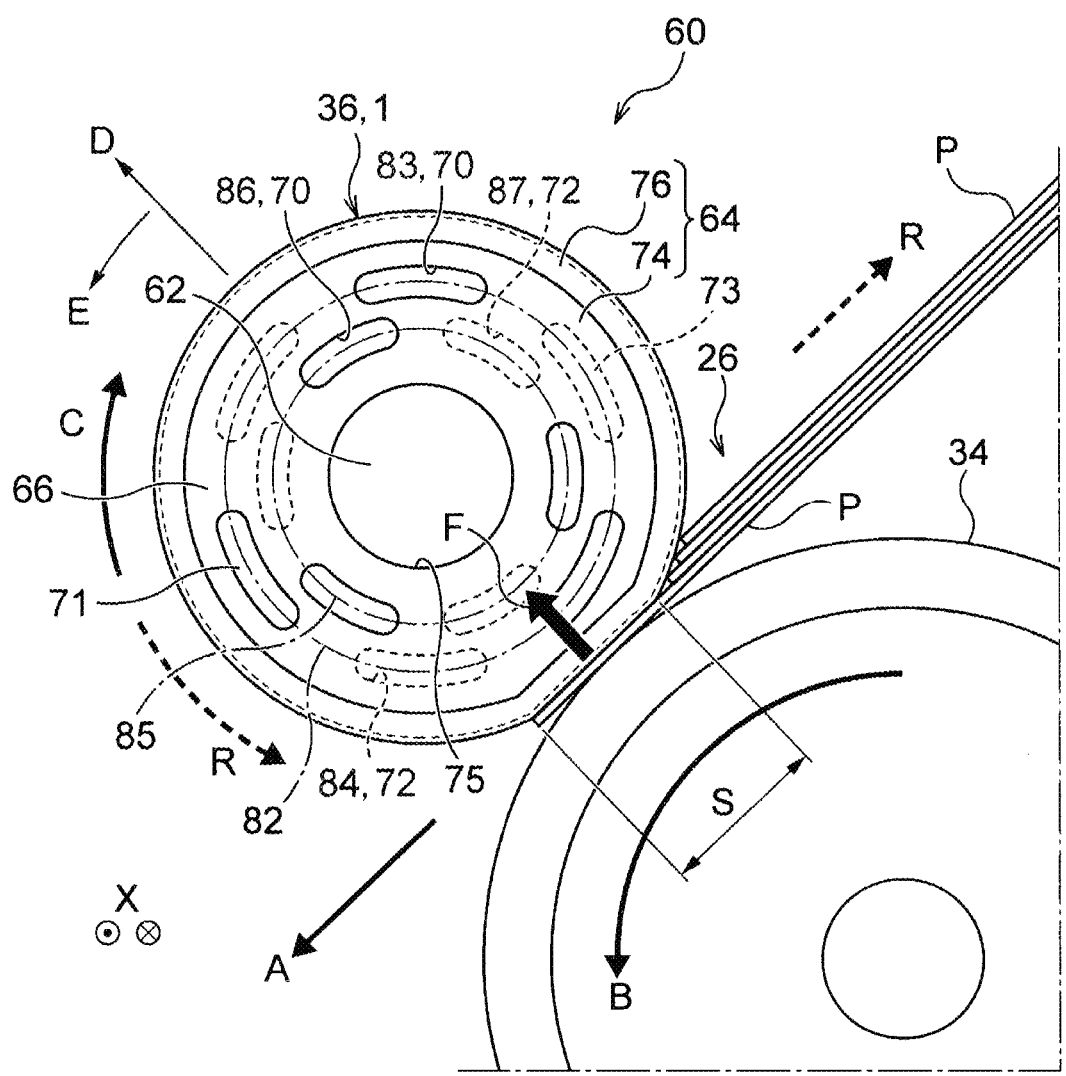
FIG. 3 is a cross-sectional view of a main portion illustrating a separation device according to Embodiment 2 of the invention.
Figure 4:
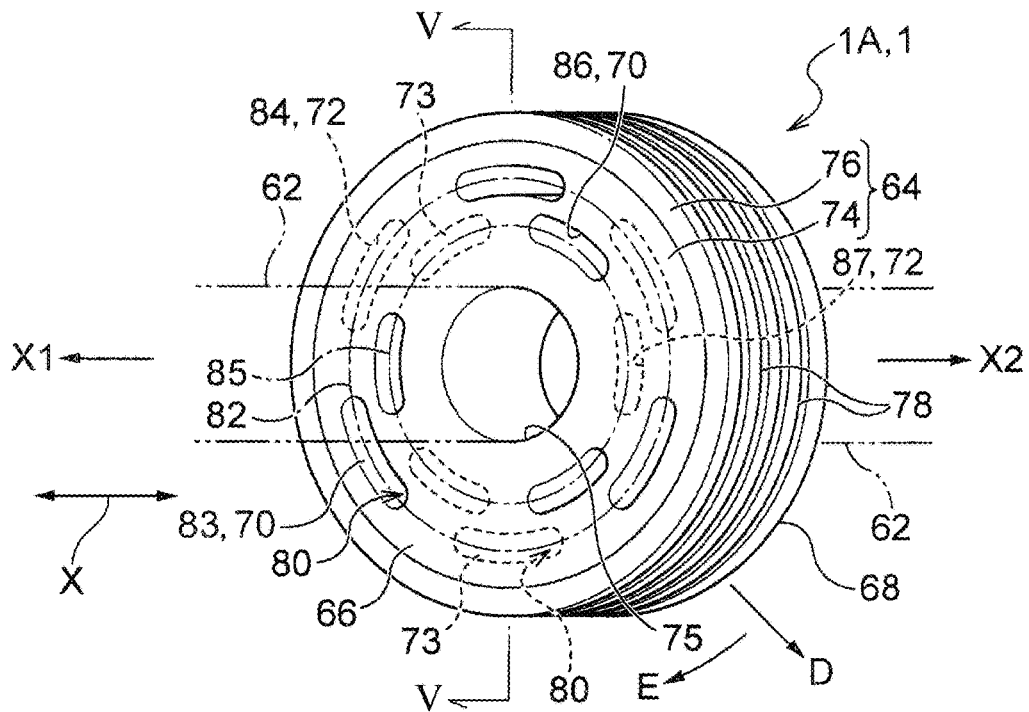
FIG. 4 is a perspective view illustrating a roller according to Embodiment 3 of the invention.
Figure 5:
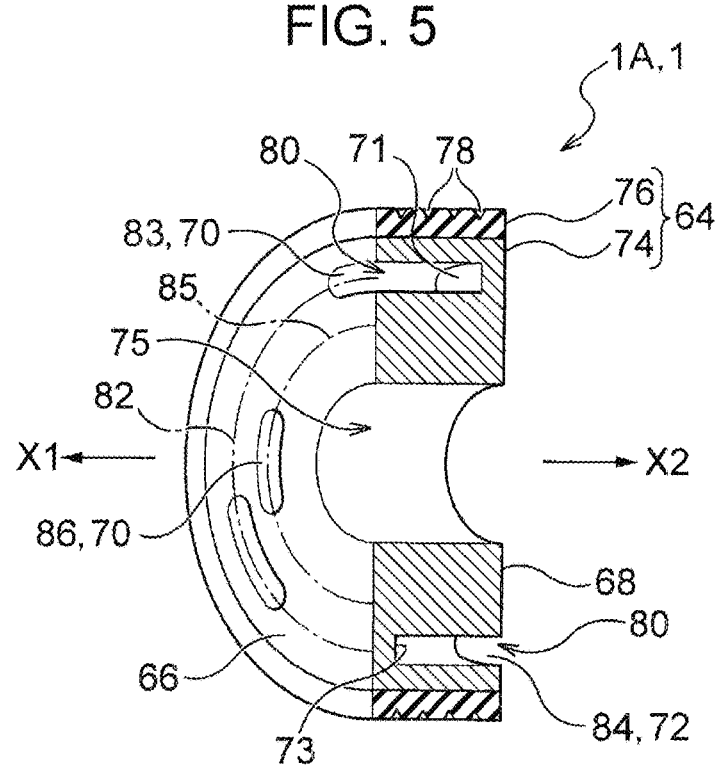
FIG. 5 is a cross-sectional view taken along line V-V in FIG. 4 illustrating the roller according to Embodiment 3 of the invention.

(1) Configuration of Separation Device (See FIGS. 3, 4, and 5)

The illustrated separation device 60 includes a feeding roller 34, and a retard roller 36 which forms a pair with the feeding roller 34, separates media P other than a medium P to be transported from a bundle G of the media, and returns the media P to the upstream, and the retard roller 36 is configured with the roller 1 of the embodiment according to the invention.

The roller 1 according to the embodiment of the invention includes a shaft 62 and elastic body portions 64 which are provided on the outer peripheral surface of the shaft 62. The elastic body portions 64 of the roller 1 are provided on the first side portion 66 on one X1 side of the roller 1 in the axial direction X at intervals in the circumferential direction E of the roller 1 and is configured to include a plurality of first recessed portion 70 which have a bottom portion 71 and a plurality of second recessed portions 72 which are provided at an interval in the circumferential direction E of the roller 1 on a second side portion 68 on the other X2 side of the roller 1 in the axial direction X and have a bottom portion 73.

Each of the first recessed portions 70 is positioned between the adjacent second recessed portions 72 and 72 in the circumferential direction E in the side view of the roller 1.

In addition, in the present embodiment and Embodiment 3 to be described below, the elastic body portion 64 further includes an inner layer portion 74 which is a side of the shaft 62, and an outer layer portion 76 which is the side in contact with the medium P, and configurations including each of the first recessed portions 70 and each of the second recessed portions 72 which are described above are adopted to the inner layer portion 74 among the inner layer portion 74 and the outer layer portion 76.

In the present embodiment, the outer layer portion 76 is configured as an example with a high friction material such as a synthetic rubber, an elastomer, or the like, similarly to the feeding roller 34 described above.

(2) Separation Action of Separation Device (See FIG. 3)

Next, the separation action of the medium P by the separation device 60 described above will be explained separately as (A) a basic separation action and (B) a specific separation action obtained by the roller 1 of the embodiment according to the invention.

(A) Basic Separation Action

When the rotational torque received from the feeding roller 34 described above exceeds the limit torque of the torque limiter 40, the retard roller 36 is disconnected from a driving system of a transport driving motor (not illustrated) that drives the retard roller 36 by the torque limiter 40, follows the feeding roller 34, and rotates in the clockwise direction as indicated by the solid arrow C in FIG. 3.

When the feeding of the medium P is started and a plurality of sheets of medium P enter between the feeding roller 34 and the retard roller 36, the retard roller 36 does not receive the rotational torque from the feeding roller 34, follows the feeding roller 34, and thus rotation thereof is stopped. The retard roller 36 receives the driving force from the transport driving motor via the torque limiter 40 and starts rotation in the opposite direction (counterclockwise direction as indicated by a broken arrow R in FIG. 3) to the feeding roller 34.

Accordingly, the upper medium P to be prevented from the multi-feeding, excluding the lowermost medium P to be fed, cannot receive the transport force for advancing to the downstream side in the medium transport direction A, and is returned to the upstream side in the medium transport direction A due to a rotation of the retard roller 36, and the multi-feeding of the medium P is prevented. Since the lowermost medium P to be fed is in direct contact with the feeding roller 34, the lowermost medium P is transported to the downstream side in the medium transport direction A by a transport force received from the feeding roller 34.

(B) Specific Separation Action

Before the medium P is supplied between the feeding roller 34 and the retard roller 36, the feeding roller 34 and the retard roller 36 are in contact with each other. When a feeding force acts on the lowermost surface medium P of the medium bundle G set on the medium mounting portion 16a by the rotation of the feeding roller 34, a plurality of sheets of medium P enter between the feeding roller 34 and the retard roller 36.

Since the retard roller 36 is not in contact with the feeding roller 34 by the medium P as described above, the driven rotation in the clockwise direction is stopped as indicated by the solid arrow C in FIG. 3, and the reverse rotation is started by own driving force thereof (in a counterclockwise direction as indicated by a broken arrow R in FIG. 3), and returns the two or more media P from the lowermost surface to the upstream in the medium transport direction A.

In the retard roller 36 to which the roller 1 of the embodiment according to the invention is applied, the moment when the medium P enters between the feeding roller 34 and the retard roller 36, the pressing force F acts from the medium P toward the retard roller 36 so that the outer peripheral surface of the retard roller 36 is slightly crushed.

Here, in order to secure the reliable separation performance of the separation device 60, although it is necessary to increase the crush amount of the retard roller 36, by applying the roller 1 of an embodiment according to the invention to the retard roller 36, a pair of each of the first recessed portions 70 and each of the second recessed portions 72 generates a well-balanced deflection in the radial direction D. In other words, in the pair of each of the first recessed portions 70 and each of the second recessed portions 72 can be increased, by the "opposite direction to axial direction X" and "positioned alternately in circumferential direction E" structure, when the roller 1 is pressed against the medium P such as paper and exerts a transporting action, the elastic body portion 64 is crushed in a well-balanced manner and the contact area thereof. In addition, each of the first recessed portions 70 and each of the second recessed portions 72 also function as deformation allowance spaces for promoting deformation of the roller 1.

Accordingly, the crush amount of the retard roller 36 increases. Therefore, an effective separation action of the medium P can be realized by the retard roller 36 according to the present embodiment to which the roller 1 according to the embodiment of the invention is applied.

Embodiment 3

(1) Configuration of Roller (See FIGS. 4 to 18)

As illustrated in FIG. 4, the roller 1A according to the present embodiment includes the shaft 62 and the elastic body portion 64 as described above, and the elastic body portion 64 is configured by including each of first recessed portions 70 which is provided on the first side portion 66 and each of second recessed portions 72 provided in the second side portion 68. Each of the first recessed portions 70 is positioned between the adjacent second recessed portions 72 and 72 in the circumferential direction E in a side view of the roller 1A.

Specifically, the shaft 62 is bridged over an appropriate support member (for example, upper unit 14) so as to extend horizontally in the axial direction X. As described above, the elastic body portion 64 has a two-layered structure including the inner layer portion 74 and the outer layer portion 76, and each of the first recessed portions 70, and each of the second recessed portions 72 which are described above are provided in the inner layer portion 74 among the inner layer portion 74 and the outer layer portion 76.

The outer layer portion 76 is a cylindrical member having a predetermined thickness in the radial direction D and having a predetermined length in the axial direction X, and on the outer peripheral surface in contact with the medium P, a plurality of annular groove portions 78 are formed in the axial direction X at a predetermined pitch. In addition, the inner peripheral surface of the outer layer portion 76 is a junction surface with the inner layer portion 74 and is formed by a smooth uniform cylindrical curved surface in the embodiment illustrated in FIGS. 4 to 9 and FIGS. 12 to 15B.

The inner layer portion 74 is a member fitted on the shaft 62, fitted in the outer layer portion 76, has a thickness larger than the outer layer portion 76 in the radial direction D, and a cross-sectional shape having a predetermined length in the axial direction is a rectangular donut shaped member. A hole portion 75 into which the shaft 62 is fitted is formed at the center of the inner layer portion 74, and the inner peripheral surface of the inner layer portion 74 is a fitting surface onto which the shaft 62 is fitted.

Figure 6:
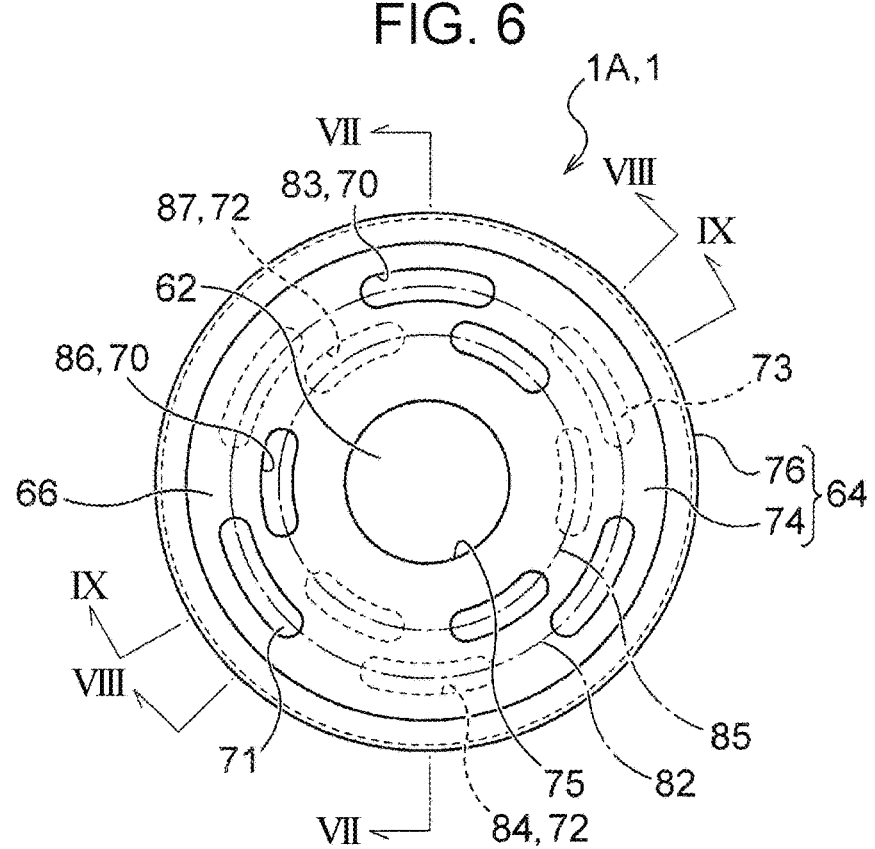
FIG. 6 is a side view illustrating the roller according to Embodiment 3 of the invention.
Figure 7:
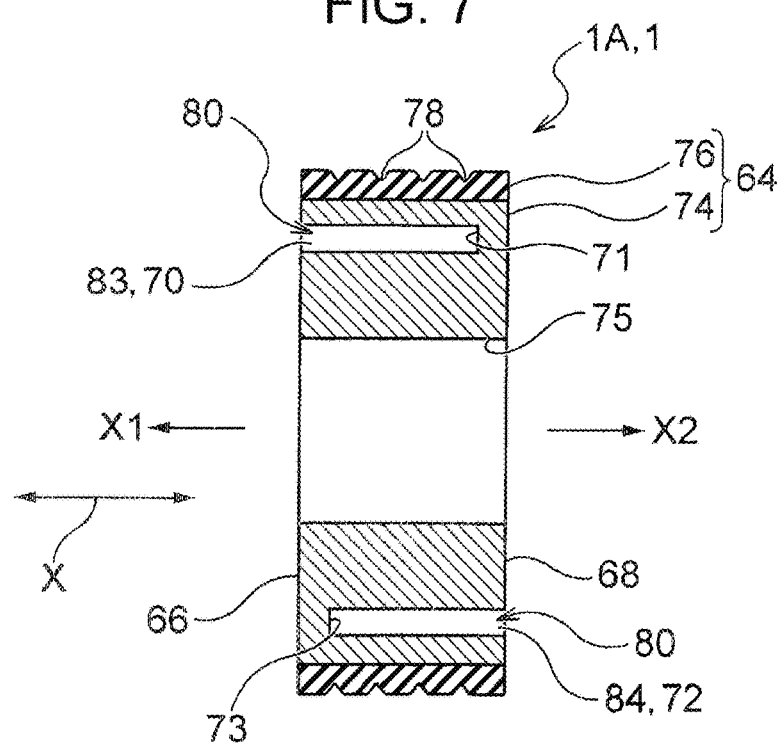
FIG. 7 is a cross-sectional view taken along line VII-VII in FIG. 6 illustrating the roller according to Embodiment 3 of the invention.
Figure 8:
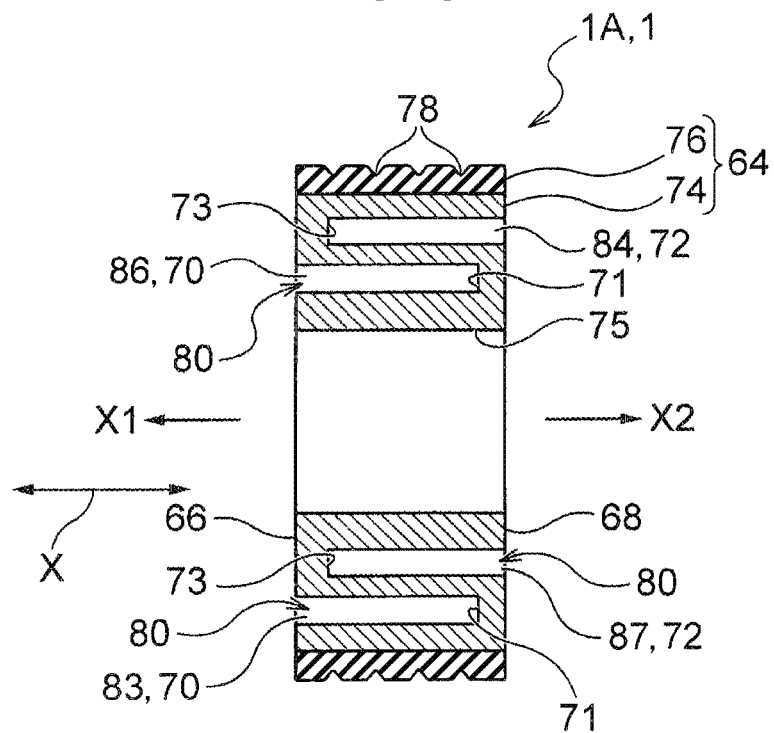
FIG. 8 is a cross-sectional view taken along line VIII-VIII in FIG. 6 illustrating the roller according to Embodiment 3 of the invention.
Figure 9:
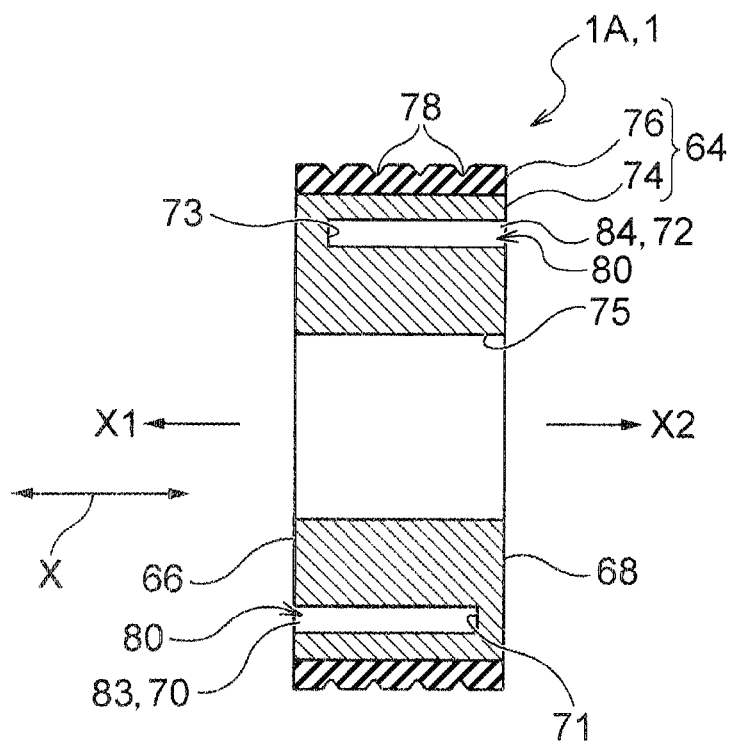
FIG. 9 is a cross-sectional view taken along line IX-IX in FIG. 6 illustrating the roller according to Embodiment 3 of the invention.

In the present embodiment, three first group first recessed portions 83 are disposed at equal intervals on a first circumference 82 positioned outward as an example of the axial direction X of the inner layer portion 74 (see FIGS. 4 and 6). The first group first recessed portion 83 has a shape of an elongated hole having a longer length in the circumferential direction E than the dimension in the radial direction D and as an example of the axial direction X, the bottom portion 71 described above (FIGS. 5 and 7) is provided in the second side portion 68 which is positioned on the other X2 side.

In addition, as an example of the axial direction X of the inner layer portion 74, on the first side portion 66 positioned on one side X1 side, on the second circumference 85 positioned on the inner side as an example in the radial direction D, in the present embodiment, the three second group first recessed portions 86 are disposed at equal intervals. Like the first group first recessed portion 83, the second group first recessed portion 86 also has a shape of an elongated hole having a longer length in the circumferential direction E than the dimension in the radial direction D, and as one example in the axial direction X, the bottom portion 71 described above is provided in the second side portion 68 which is positioned on the other X2 side. Each of the first recessed portions 70 is configured by including the three first group first recessed portion 83 and the three second group first recessed portion 86.

In addition, on the second side portion 68 positioned on the other side X2 side as an example of the axial direction X of the inner layer portion 74, on the first circumference 82 positioned on the outer side as an example in the radial direction D, in the present embodiment, three first group second recessed portions 84 are disposed at equal intervals (FIGS. 4 and 6). Like the first group first recessed portion 83, the first group second recessed portion 84 also has a shape of an elongated hole having a longer length in the circumferential direction E than the dimension in the radial direction D, and as an example in the axial direction X, the bottom portion 73 described above (FIGS. 5 and 7) is provided in the first side portion 66 which is positioned on the X1 side.

In addition, as an example in the axial direction X of the inner layer portion 74, on the second side portion 68 positioned on the other side X2 side, on the second circumference 85 positioned on the inner side as an example in the radial direction D, 87, in the present embodiment, three second group second recessed portions 87 are disposed at equal intervals. Like the first group second recessed portion 84, these second group second recessed portions 87 also have shapes of an elongated hole having a longer length in the circumferential direction E than the dimension in the radial direction D, and as an example in the axial direction X, on the first side portion 66 positioned on the one X1 side, the bottom portion 73 described above is provided. Each of the second recessed portion 72 is configured by including the three first group second recessed portion 84 and the three second group second recessed portion 87.

In addition, in the present embodiment, the first group first recessed portion 83 and the second group first recessed portion 86 positioned on the first side portion 66 are disposed while phases thereof are somewhat shifted in the circumferential direction E so that portions thereof are disposed while being overlapped each other in the circumferential direction E of the roller 1A. Along with this, the first group second recessed portion 84 and the second group second recessed portion 87 positioned on the second side portion 68 are also disposed while phases thereof are somewhat shifted so that portions thereof are disposed while being overlapped each other in the circumferential direction E of the roller 1A.

Therefore, in the first side portion 66, three first group first recessed portions 83 are disposed at equal intervals in the circumferential direction E on the first circumference 82, and three bottom portions 73 of the first group second recessed portion 84 are configured to be also disposed between the adjacent first group first recessed portions 83 and 83.

In addition, in the first side portion 66, three second group first recessed portions 86 are disposed at equal intervals in the circumferential direction E on the second circumference 85, and three bottom portions 73 of the second group second recessed portion 87 are configured to be also disposed between the adjacent second group first recessed portions 86 and 86.

On the other hand, in the second side portion 68, three first group second recessed portions 84 are disposed at equal intervals in the circumferential direction E on the first circumference 82, and three bottom portions 71 of the first group first recessed portion 83 are configured to be also disposed between the adjacent first group second recessed portions 84 and 84.

In addition, in the second side portion 68, three second group second recessed portions 87 are disposed at equal intervals in the circumferential direction E on the second circumference 85, and three bottom portions 71 of the second group first recessed portion 86 are configured to be also disposed between the adjacent second group second recessed portion 87 and 87.

By providing the bottom portion 71 of each of the first recessed portions 70 and the bottom portion 73 of each of the second recessed portions 72, the space 80 that can be formed inside each of the first recessed portions 70 and each of the second recessed portions 72 is a space 80 which does not penetrate in the axial direction X.

In addition, in the present embodiment, since each of the first recessed portions 70 and each of the second recessed portions 72 are provided by shifting the pitch in the circumferential direction E by three, as illustrated in FIGS. 5, 7, 8, and 9, each of the first recessed portions 70 and each of the second recessed portions 72 have the opposite positional relationship in the vertical direction. Then, due to this opposite positional relationship, the crush of the roller 1A is realized in the well-balanced manner.

In addition, each of the first recessed portions 70 formed from the first side portion 66 side and each of the second recessed portions 72 formed from the second side portion 68 side are disposed to be asymmetric with respect to the center plane orthogonal to the shaft mounting direction.

In addition, as a constituent material of the elastic body portion 64 configured as described above, a non-foamed material is preferable and by adopting the structure including each of the first recessed portions 70 and each of the second recessed portions 72, the reaction force can be reduced to, for example, $\frac{1}{10}$ or less, it is possible to secure a crushed amount of the outer peripheral surface of the roller 1A equal to or higher than that of the foamed rubber even if using materials of various rubber hardness.

Figure 11:
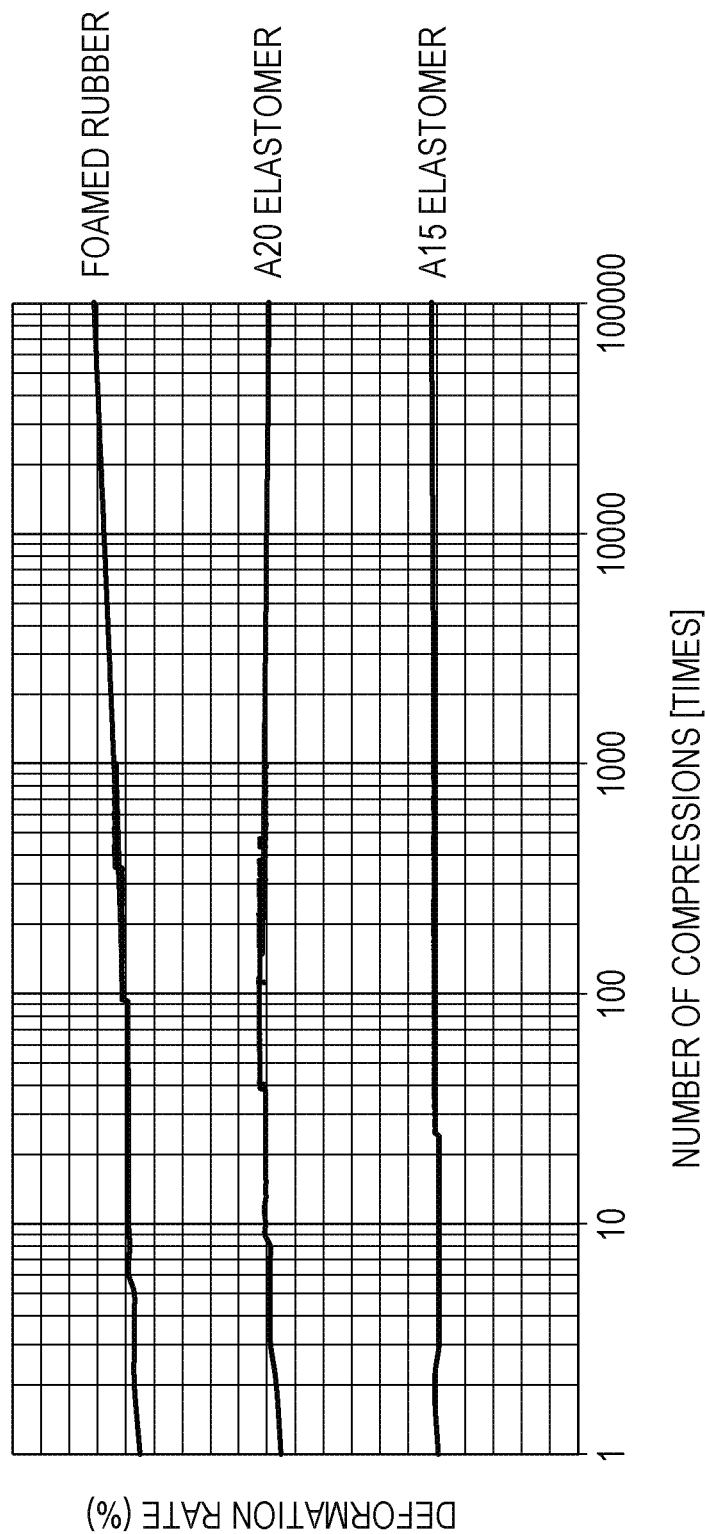
FIG. 11 is a graph illustrating a relationship between the number of compressions and the deformation rate due to the difference in raw materials.

In addition, looking at the relationship between the number of compressions and the deformation rate due to the difference in constituent material of the elastic body portion 64 illustrated in FIG. 11, as the number of compressions of the formed rubber increases, the deformation amount thereof gradually increases and the shape thereof does not recover, and regarding this, in a case of A15 elastomer or A20 elastomer which is a non-foamed material, it is understood that the deformation amount thereof is almost constant and the shape thereof recovers even if the number of compressions thereof increases.

Therefore, from the viewpoint of durability, it can be said that the non-foamed synthetic rubber or elastomer is more preferable as the constituent material of the elastic body portion 64 than the foam material such as foamed rubber.

Figure 12:
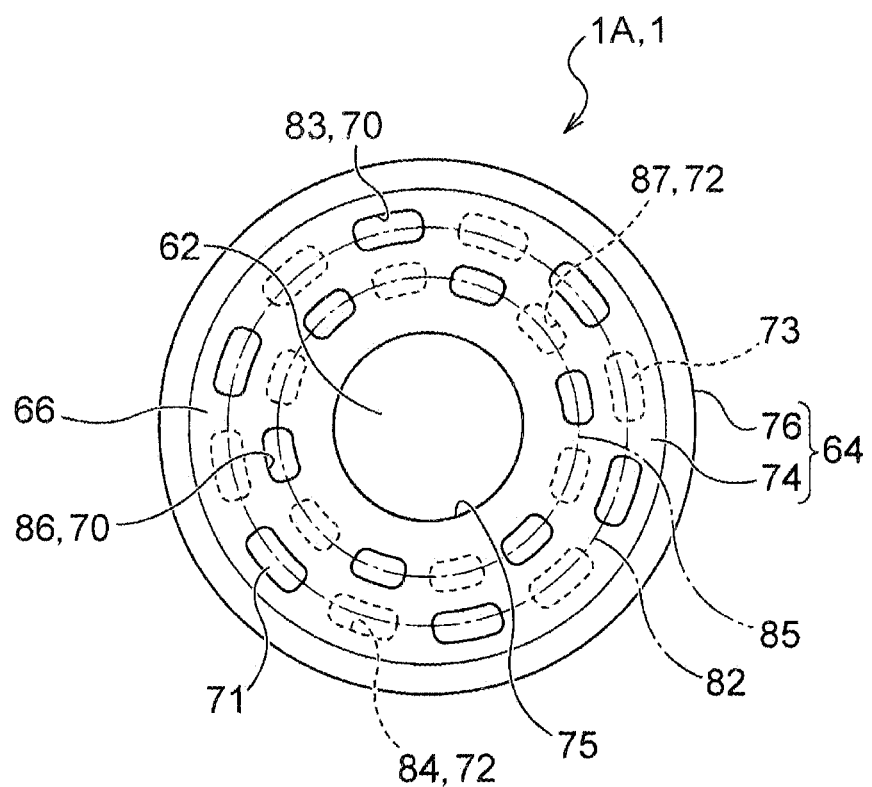
FIG. 12 is a side view illustrating a state where six first recessed portions and six second recessed portions are disposed on the same circumference representing the roller according to Embodiment 3 of the invention.

In addition, three first recessed portions 70 and three second recessed portions 72 may be provided on the same circumference and alternatively, six first recessed portions 70 and six second recessed portions 72 may be provided as illustrated in FIG. 12 by increasing the number, for example. By the way, in the modification example illustrated in FIG. 12, the six first group first recessed portions 83 and the six first group second recessed portions 84 are provided on the first circumference 82 by shifting the pitch, and the six second group first recessed portions 86 and the six second group second recessed portions 87 are provided on the second circumference 85 by shifting the pitch.

Figure 13A:
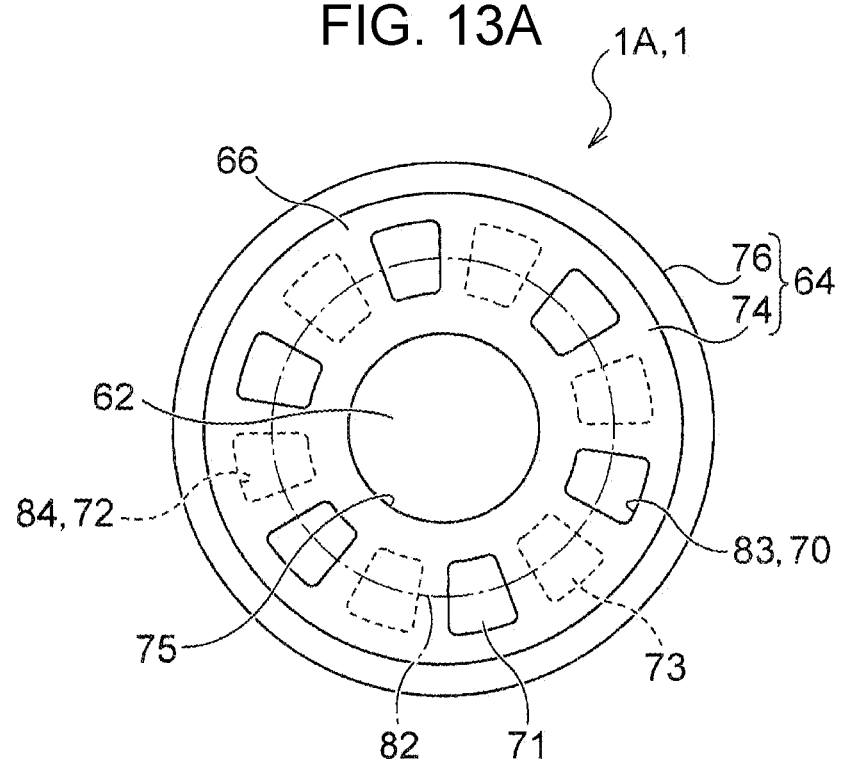
FIG. 13A is a side view illustrating a state where each of the first recessed portions and each of the second recessed portions are disposed on one circumference representing the roller according to Embodiment 3 of the invention.
Figure 13B:
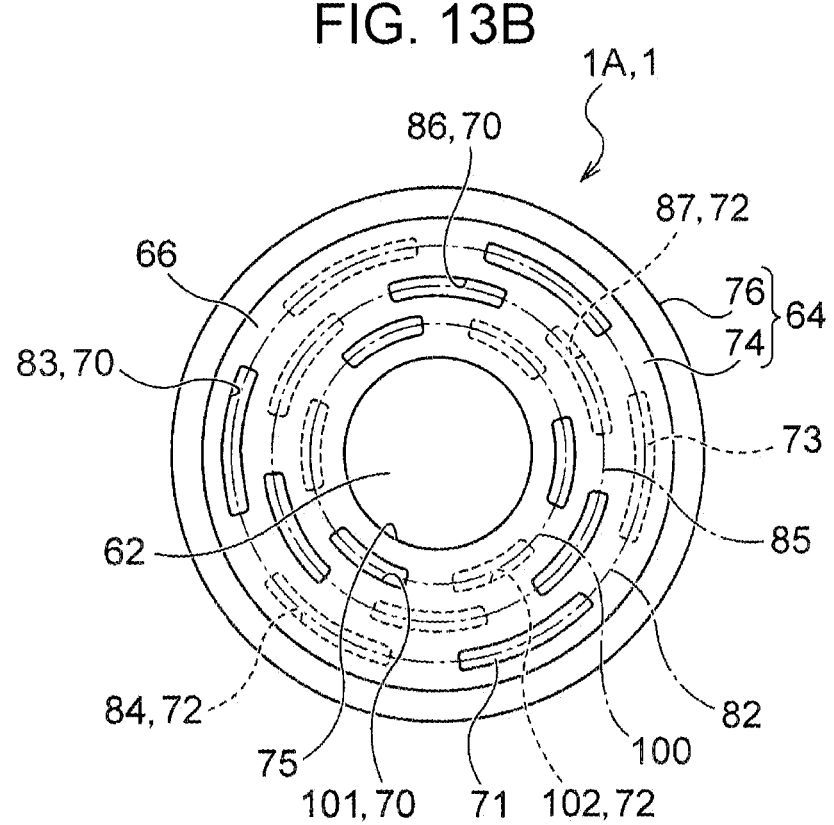
FIG. 13B is a side view illustrating a state where first recessed portions and second recessed portions are disposed on three circumferences representing the roller according to Embodiment 3 of the invention.

In addition, each of the first recessed portions 70 and each of the second recessed portions 72 may be provided on two circumferences of the first circumference 82 and the second circumference 85, and alternatively, for example, as illustrated in FIG. 13A may be provided only one circumference (for example, first circumference 82) or may be provided on three circumferences of the first circumference 82, the second circumference 85, and the third circumference 100 as illustrated in FIG. 13B. In FIG. 13B, in addition to the configurations illustrated in FIGS. 4 to 9, there is disclosed a modification example in which the three third group first recessed portions 101 and the three third group second recessed portions 102 are provided on the third circumference 100 by shifting the pitch.

Figure 14A:
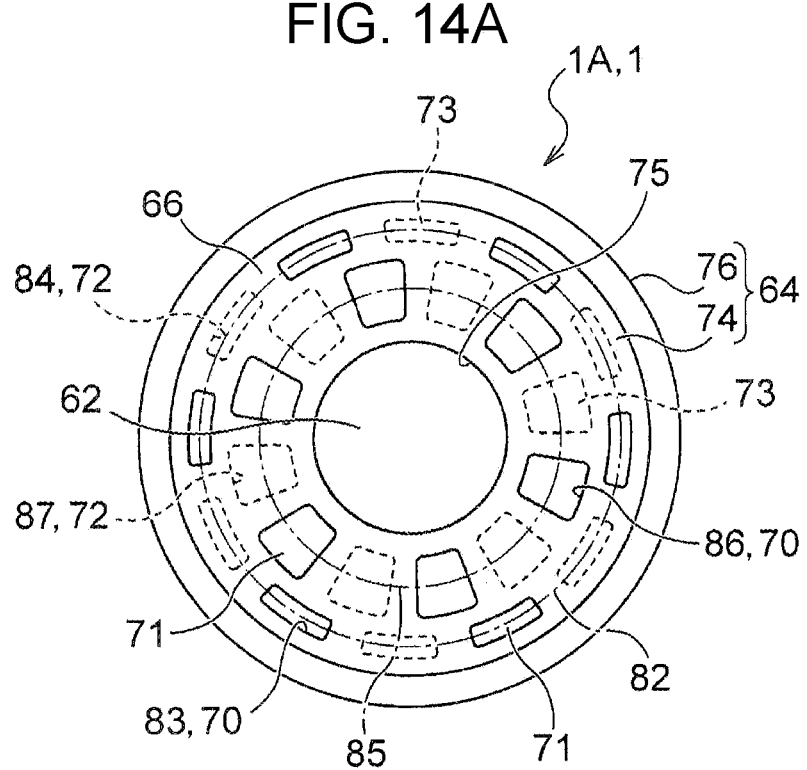
FIG. 14A is a side view illustrating a modification example in which a volumetric ratio between each of the first recessed portions and each of the second recessed portions is different by a circumference illustrating and disposing the roller according to Embodiment 3 of the invention.

In addition, as illustrated in FIG. 14A, volumetric ratios of each of the first recessed portions 70 and each of the second recessed portions 72 provided on different circumferences can be different from each other. In FIG. 14A, each of the first recessed portions 70 and each of the second recessed portions 72 provided on the first circumference 82 have shapes of an elongated holes having a longer length in the circumferential direction E than the thickness in the radial direction D and on the other hands, a modification example in which each of the first recessed portions 70 and each of the second recessed portions 72 provided on the second circumference 85 have a rectangular or trapezoidal shape in which the dimension in the radial direction D is larger than the length in the circumferential direction E is disclosed.

Figure 14B:
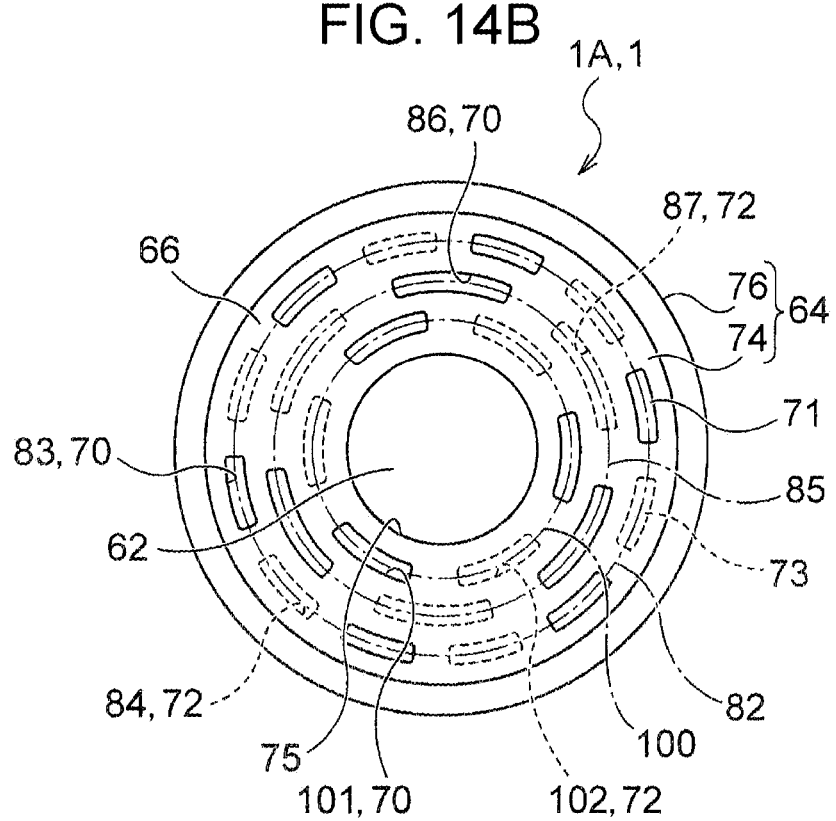
FIG. 14B is a side view illustrating a modification example in which a number between each of the first recessed portions and each of the second recessed portions is different by a circumference illustrating and disposing the roller according to Embodiment 3 of the invention.

In addition, as illustrated in FIG. 14B, the numbers of each of the first recessed portions 70 and each of the second recessed portions 72 provided on different circumferences can be different from each other. In FIG. 14B, six first recessed portions 70 and six second recessed portions 72 are provided on the first circumference 82 on the outermost circumference by shifting the pitch and a modification example in which the three first recessed portions 70 and the three second recessed portions 72 are provided on the second circumference 85 and the third circumference 100 which are positioned at the inner peripheral side by shifting the pitch is disclosed.

Figure 15A:
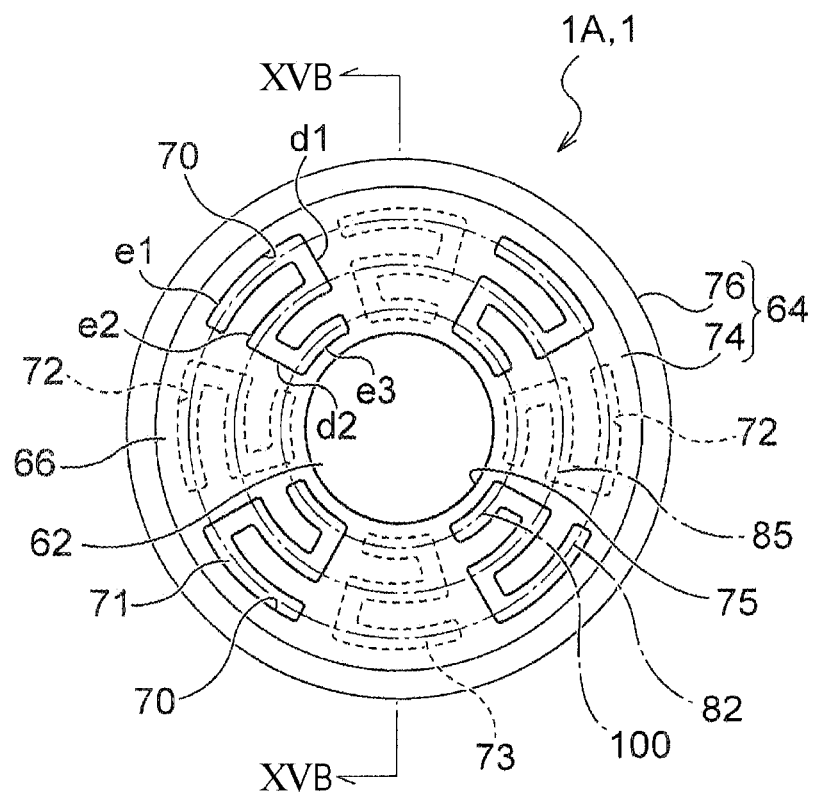
FIG. 15A is a side view illustrating each of first recessed portions and each of second recessed portions having different shapes representing a modification example of the roller according to Embodiment 3 of the invention.

Further, as illustrated in FIG. 15A, each of the first recessed portions 70 and each of the second recessed portions 72 may have a shape in which a component of the roller 1A in the circumferential direction E and a component thereof in the radial direction D are connected in a side view. In FIG. 15A, on the first side portion 66, a peripheral direction component e1 passing over the first circumference 82, a peripheral direction component e2 passing over the second circumference 85, and a peripheral direction component e3 passing over the third circumference 100 are provided and each of the first recessed portions 70 having an S-shape in a side view in which one end of the peripheral direction component e1 and one end of the peripheral direction component e2 are connected by a radial direction component d1 and the other end of the peripheral direction component e2 and the other end of the peripheral direction component e3 are connected by a radial direction component d2 is formed. Similarly, each of the second recessed portions 72 having an S shape in a side view is formed on the second side portion 68.

Figure 15B:
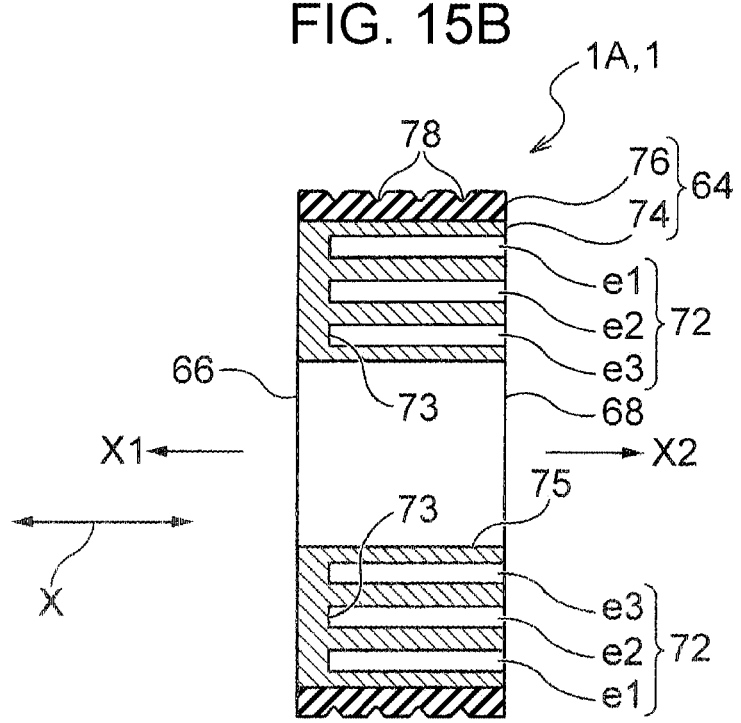
FIG. 15B is a cross-sectional view taken along line XVB-XVB in FIG. 15A.

In a case of this modification example, as illustrated in FIG. 15B, each of the first recessed portions 70 or each of the second recessed portions 72 is positioned on the opposing surfaces in the vertical direction.

Figure 16A:
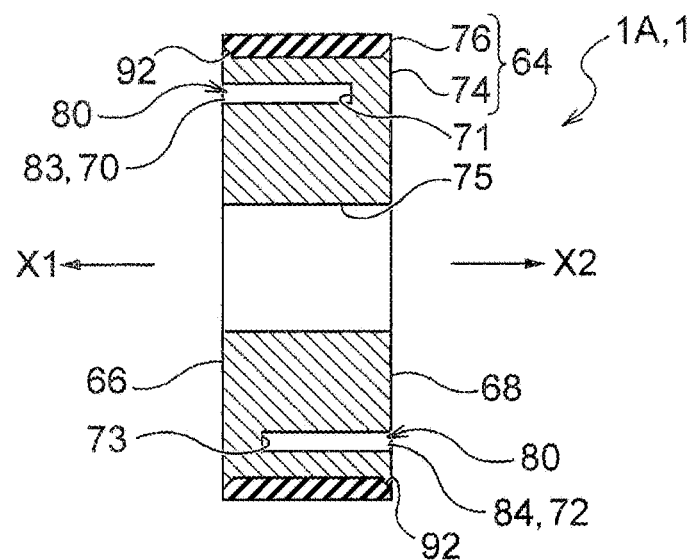
FIG. 16A is a longitudinal sectional view illustrating an example of a junction structure of an inner layer portion and an outer layer portion representing the roller according to Embodiment 3 of the invention.
Figure 16B:
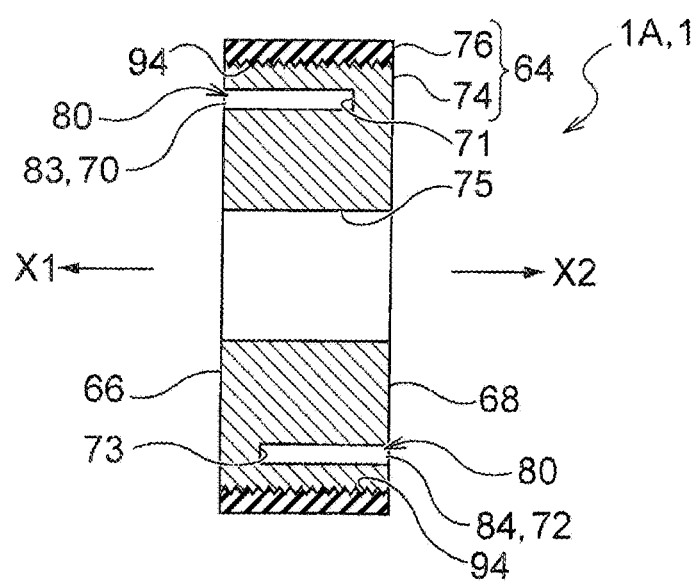
FIG. 16B is a longitudinal sectional view illustrating another example of a junction structure of the inner layer portion and an outer layer portion representing the roller according to Embodiment 3 of the invention.

In addition, various junction structures illustrated in FIGS. 16A to 18 can be adopted as a structure for improving the adhesion between the inner layer portion 74 and the outer layer portion 76. Specifically, as illustrated in FIG. 16A, a chamfer 92 is formed on the edges on one side X1 side and the other side X2 side of the inner peripheral surface of the outer layer portion 76, or the inner peripheral surface of the outer layer portion 76 is roughened as illustrated in FIG. 16B so that fine irregularities 94 can be formed.

Figure 16C:
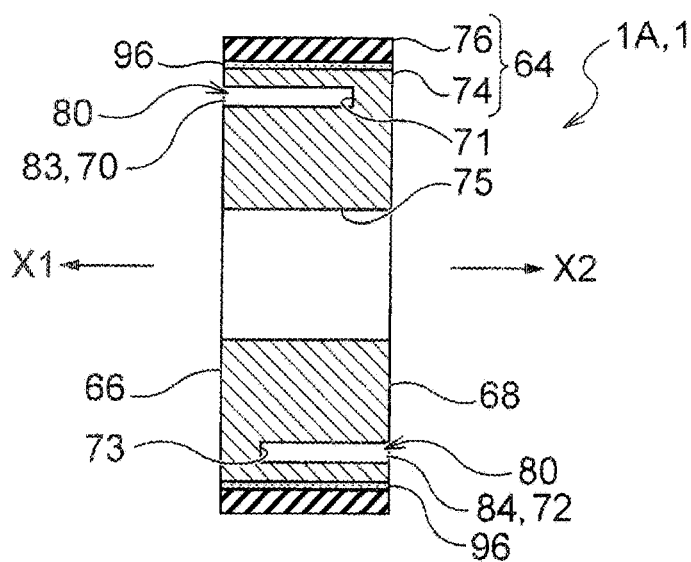
FIG. 16C is a longitudinal sectional view illustrating still another example of a junction structure of the inner layer portion and an outer layer portion representing the roller according to Embodiment 3 of the invention.

In addition, as illustrated in FIG. 16C, primer treatment is applied to the inner peripheral surface of the outer layer portion 76 before the inner layer portion 74 is insert molded, and an adhesive 96 is applied to the surface thereof to adhere the inner layer portion 74 and the outer layer portion 76.

Figure 17A:
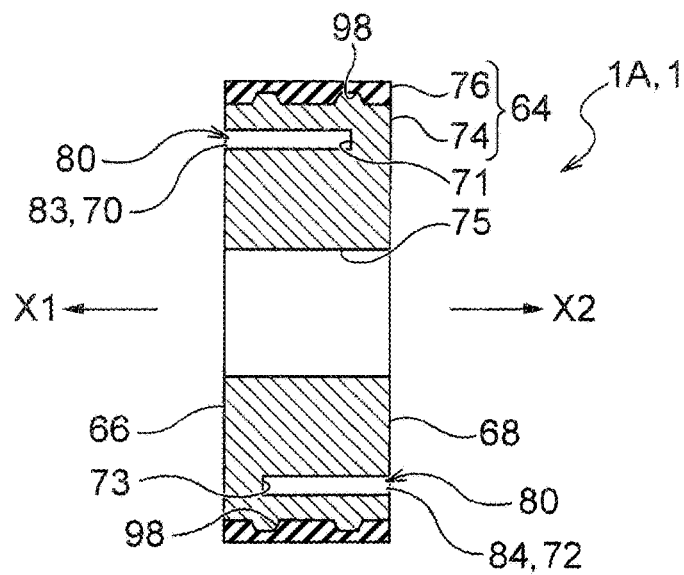
FIG. 17A is a longitudinal sectional view illustrating still another example of a junction structure of the inner layer portion and the outer layer portion representing the roller according to Embodiment 3 of the invention.
Figure 17B:
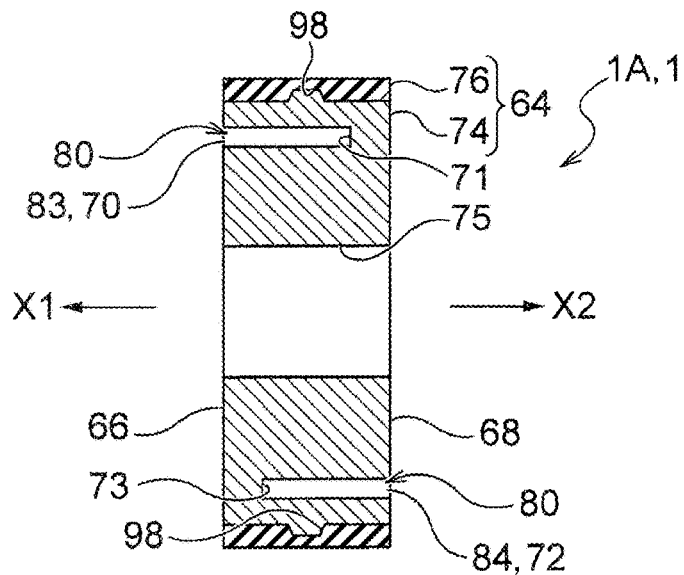
FIG. 17B is a longitudinal sectional view illustrating still another example of a junction structure of the inner layer portion and the outer layer portion representing the roller according to Embodiment 3 of the invention.
Figure 17C:
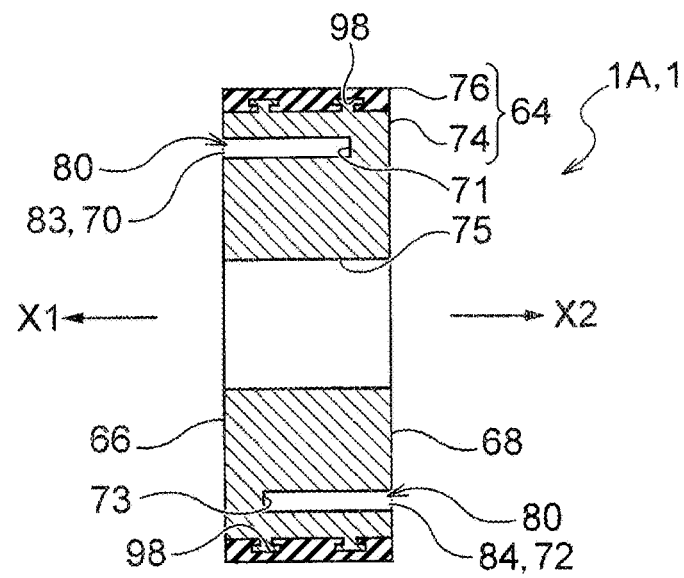
FIG. 17C is a longitudinal sectional view illustrating still another example of a junction structure of the inner layer portion and the outer layer portion representing the roller according to Embodiment 3 of the invention.

In addition, as illustrated in FIGS. 17A, 17B, and 17C, it is possible to form a groove 98 in the inner peripheral surface of the outer layer portion 76 and the cross-sectional shape of the groove 98 may be a trapezoidal shape illustrated in FIGS. 17A and 17B, a triangular shape, a quadrangular shape, or an undercut shape such as a mushroom shape, a dovetail groove shape, or the like having a head portion at the leading end portion as illustrated in FIG. 17C. In addition, as illustrated in FIG. 17, the groove 98 can be provided, and alternatively, as illustrated in FIGS. 17A and 17C, a plurality of grooves 98 can be provided.

Figure 18:
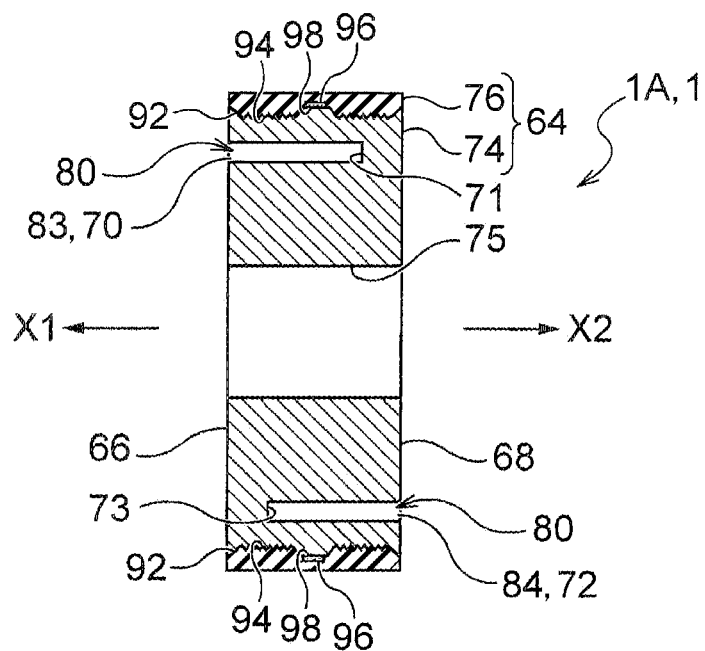
FIG. 18 is a longitudinal sectional view illustrating still another example of a junction structure of the inner layer portion and the outer layer portion representing the roller according to Embodiment 3 of the invention.

Further, as illustrated in FIG. 18, a junction structure of a complex configuration in which the chamfer 92, the fine irregularities 94, the adhesive 96 and the groove 98 described in FIGS. 16A, 16B, 16C and FIGS. 17A, 17B, 17C which are described above can also be adopted.

In addition to this, although not illustrated, each of the first recessed portions 70 and each of the second recessed portions 72 are provided along the circumferential direction E completely and alternatively may be provided while being inclined somewhat so that the distance in the radial direction D gradually differs and may be provided as each of the first recessed portions 70 and each of the second recessed portions 72 inclined somewhat also in the axial direction X.

(2) Molding and Action of Roller (Refer to FIGS. 4 to 9, 10, 11 to 18)

Figure 10:
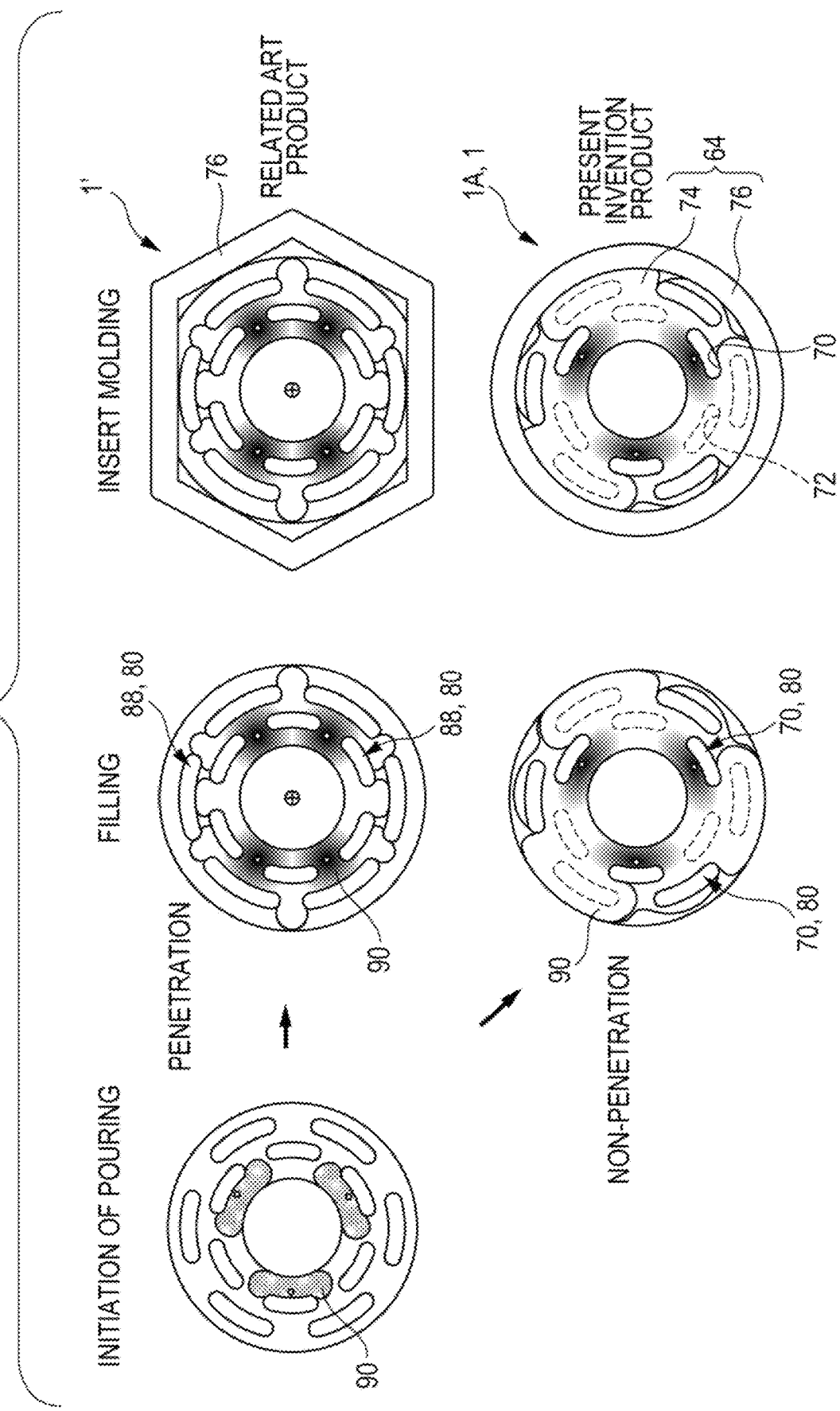
FIG. 10 is an explanation view illustrating a comparison between an aspect of flow of the raw material during the insert molding of the roller according to Embodiment 3 of the invention and an example of the related art having a penetration portion in an axial direction.

In order to mold the roller 1A configured as described above, as an example, insert molding into which the raw material 90 is poured to be filled can be adopted. FIG. 10 illustrates an embodiment of a flow of a raw material 90 of the related art product configured with a through hole 88 penetrating the space portion 80 of the roller 1' in the axial direction X and the present invention product configured with each of the first recessed portions 70 and each of the second recessed portions 72 which do not penetrate the space portion 80 of the roller 1A in the axial direction is illustrated.

In this case, in the related art product, it is difficult to secure the fluidity of the raw material 90, and the time required until completion of filling is likely to be long. Accordingly, the heat history when the raw material 90 is cured becomes more likely to be changed depending on locations, and when the final molded product is formed, the outer layer portion 76 of the roller 1' is deformed and the shape accuracy of the outer peripheral surface of the roller 1' is likely to decrease.

In contrast, in the present invention product, the fluidity of the raw material 90 is better with the presence of the bottom portion 71 of each of the first recessed portions 70 and the bottom 73 of each of the second recessed portions 72, and the present invention product is filled with the raw material 90 up to every corner thereof and the time required for completion of filling is shortened. Accordingly, the change of the thermal history according to locations at the time of curing the raw material 90 is reduced, and even when it becomes the final molded product, large deformation is not generated at the outer layer portion 76 of the roller 1A, and thus the shape accuracy of the outer peripheral surface of the roller 1A increases.

According to the roller 1A of the present embodiment configured as described above, the outer peripheral surface of the roller 1A is structurally easily crushed not by selection of materials, and the area of the contact surface S can be enlarged.

In other words, when the pressing force F directed toward the center of the roller 1A is applied by pressing against the medium P by the roller 1A, since each of the first recessed portions 70 and each of the second recessed portions 72 have the "opposite in axial direction X" and "positioned alternately in circumferential direction E" structure, when the roller 1A is pressed against the medium P such as paper and exerts a transporting action, the elastic body portion 64 is crushed in a well-balanced manner and the contact area thereof can be increased. Even if the elastic body portion 64 is formed using a material having a high rubber hardness, it is easily crushed and the contact area thereof can be increased by the "opposite direction to the axial direction X" and "positioned alternately in circumferential direction E" structure. In addition, since each of the first recessed portions 70 and each of the second recessed portions 72 also function as a deformation allowance space for promoting deformation of the roller 1A, a large crush amount of the roller 1A can be secured.

Furthermore, by disposing each of the first recessed portions 70 and each of the second recessed portions 72 equally as described above, crush of the outer peripheral surface of the roller 1A can be realized in a more well-balanced manner.

Embodiment 4

Figure 19:
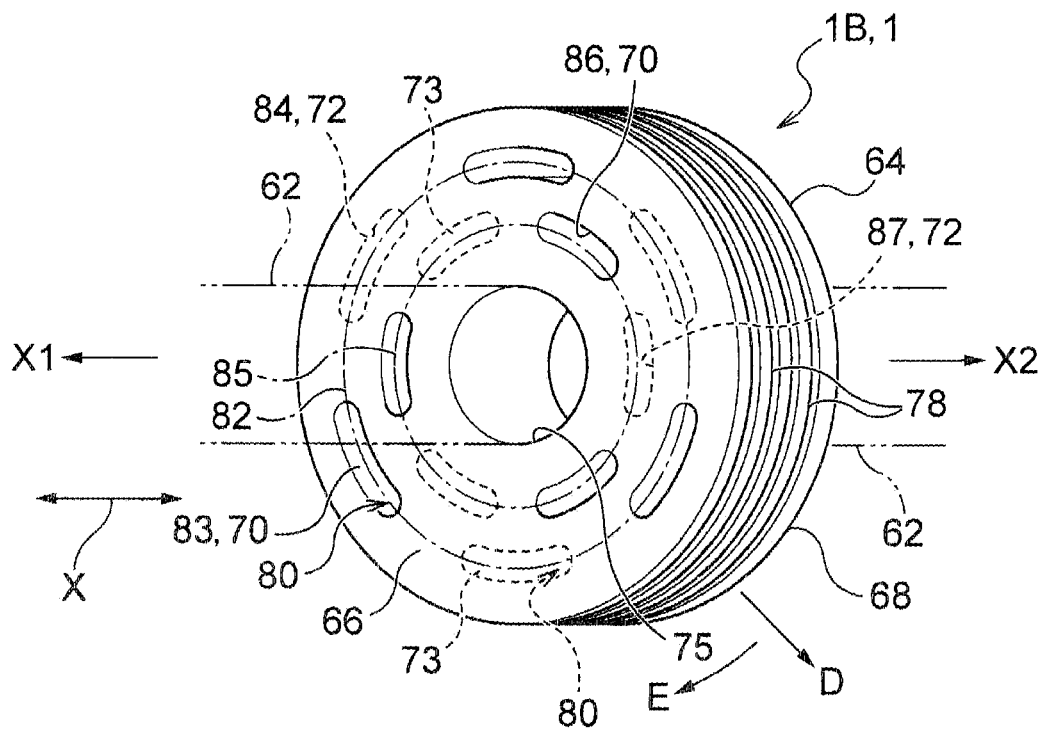
FIG. 19 is a perspective view illustrating a roller according to Embodiment 4 of the invention.

(1) Configuration of Roller (See FIG. 19)

In the roller 1B according to the present embodiment, the roller 1A according to Embodiment 3 is configured with two members of the inner layer portion 74 and the outer layer portion 76, whereas the outer layer portion 76 of the separate member is eliminated, and the inner layer portion 74 is configured with a single member having the function of the outer layer portion 76.

Therefore, since the other constitution is the same as that of Embodiment 3, here, the same configuration as that of Embodiment 3 will be briefly explained or explanation thereof will be omitted and the unique configuration of the roller 1B according to the present embodiment will be mainly described.

In other words, the roller 1B according to the present embodiment, like the roller 1A according to Embodiment 3, includes a shaft 62 and an elastic body portion 64 and the elastic body portion 64 is configured by including each of first recessed portions 70, and each of second recessed portions 72.

Each of the first recessed portions 70 is positioned between the adjacent second recessed portions 72 in the circumferential direction E in the side view of the roller 1B and the elastic body portion 64 is configured by a single member.

Accordingly, in the roller 1B according to the present embodiment, the diameter of the inner layer portion 74 of Embodiment 3 increases by the thickness of the outer layer portion 76 in the radial direction D and is formed on the outer peripheral surface of the outer layer portion 76 in Embodiment 3.

In addition, regarding the modification example described above in which the constituent material of the elastic body portion 64, the shapes, the number, the arrangement, and the like of each of the first recessed portions 70 and each of the second recessed portions 72 are different, the one described in Embodiment 3 can be adopted as it is.

(2) Molding and Action of Roller

In order to mold the roller 1B configured as described above, injection molding, in which the heated and softened raw material 90 is pushed into a closed mold, cooled, solidified, and molded, can be adopted as an example. Also, in this case, the effect illustrated in FIG. 10 described in Embodiment 3 can be obtained, large deformation is not generated on the outer peripheral surface of the roller 1B, and the shape accuracy of the outer peripheral surface of the roller 1B is improved.

Also in the present embodiment, like Embodiment 3, the outer peripheral surface of the roller 1B can be structurally easily crushed in a well-balanced manner not by selection of materials, and the contact area with the medium P can be increased.

OTHER EMBODIMENTS

Although the roller 1, the separation device 60, and the image reading apparatus 10 according to the embodiment of the invention are based on the configuration as described above, the partial configuration without departing from the gist of the invention, can naturally change, omit, apply to other devices, or the like.

For example, the roller 1 of the embodiment according to the invention as described above and the separation device 60 applying the roller 1 to the retard roller 36 can be applied to a recording apparatus that executes recording on the medium P. In other words, the recording apparatus of the embodiment according to the invention is a recording apparatus such as an ink jet printer or the like including a recording portion such as a recording head, and a roller that is provided in a medium transport path 26 passing through the recording execution region of the recording portion to apply a feeding force to the medium P, in which the roller has a structure in which the contact surface S is elastically crushed when pressed against the medium P and at least one of the rollers, for example, the retard roller 36 can be configured with the roller 1 of the embodiment according to the invention.

In addition, the depths of each of the first recessed portions 70 and each of the second recessed portions 72 in the axial direction X may be formed all the same, or a portion or all the depths thereof may be made different. Specifically, the depths of each of the first recessed portions 70 and each of the second recessed portions 72 can be individually different from each other in the plurality of first recessed portions 70 or in the plurality of second recessed portions 72, be different from each other in each of the first recessed portions 70 and each of the second recessed portions 72 or be made different depending on the position in the radial direction D.

The entire disclosure of Japanese Patent Application No. 2017-079506, filed Apr. 13, 2017, and 2017-079505, filed Apr. 13, 2017, are expressly incorporated by reference herein.

What is claimed is:

1. A roller configured for contacting a medium comprising:
   a shaft; and
   an elastic body portion that is provided on an outer peripheral surface of the shaft and configured for contacting the medium,
   the elastic body portion comprises:
      a plurality of first recessed portions which are provided on a first side of the roller in a shaft mounting direction at intervals in a circumferential direction of the roller and each have a first bottom portion, and
      a plurality of second recessed portions which are provided on a second side of the roller in the shaft mounting direction at intervals in the circumferential direction of the roller and each have a second bottom portion, and
   wherein each of the first recessed portions is positioned between the adjacent second recessed portions in the circumferential direction of the roller in a side view of the roller in the shaft mounting direction, and
   wherein the first bottom portion is closer to the second side of the roller in the shaft mounting direction than the second bottom portion.

2. The roller according to claim 1,
   wherein each of the first recessed portions and each of the second recessed portions are formed so as to be symmetrical with respect to a plane orthogonal to the shaft mounting direction.

3. A separation device comprising:
   a feeding roller; and
   a retard roller that forms a pair with the feeding roller, separates media other than a medium to be transported from a bundle of media, and returns the media to the upstream side thereof,
   wherein the retard roller is the roller according to claim 2.

4. An image reading apparatus comprising:
   a reading portion that reads image information of a medium; and
   a roller that is provided in a medium transport path which passes through a reading execution region of the reading portion and that applies a feeding force to the medium,
   wherein the roller has a structure in which a contact surface between the roller and the medium is elastically crushed when the roller is pressed against the medium, and
   wherein at least one of the rollers is the roller according to claim 2.

5. The roller according to claim 1,
   wherein a constituent material of the elastic body portion is a non-foamed material.

6. A separation device comprising:
   a feeding roller; and
   a retard roller that forms a pair with the feeding roller, separates media other than a medium to be transported from a bundle of media, and returns the media to the upstream side thereof,
   wherein the retard roller is the roller according to claim 5.

7. An image reading apparatus comprising:
   a reading portion that reads image information of a medium; and
   a roller that is provided in a medium transport path which passes through a reading execution region of the reading portion and that applies a feeding force to the medium,
   wherein the roller has a structure in which a contact surface between the roller and the medium is elastically crushed when the roller is pressed against the medium, and
   wherein at least one of the rollers is the roller according to claim 5.

8. The roller according to claim 1,
   wherein the elastic body portion includes:
      an inner layer portion which comprises a side that is adjacent to the shaft, and an outer layer portion which comprises a side which is in contact with the medium, and
wherein the inner layer portion includes:
the first recessed portions, and
the second recessed portions.

9. A separation device comprising:
a feeding roller; and
a retard roller that forms a pair with the feeding roller, separates media other than a medium to be transported from a bundle of media, and returns the media to the upstream side thereof,
wherein the retard roller is the roller according to claim 8.

10. An image reading apparatus comprising:
a reading portion that reads image information of a medium; and
a roller that is provided in a medium transport path which passes through a reading execution region of the reading portion and that applies a feeding force to the medium,
wherein the roller has a structure in which a contact surface between the roller and the medium is elastically crushed when the roller is pressed against the medium, and
wherein at least one of the rollers is the roller according to claim 8.

11. The roller according to claim 1,
wherein the first recessed portions include
first group first recessed portions which are positioned on a first circumference, and
second group first recessed portions which are positioned on a second circumference different from the first circumference, and
wherein the second recessed portions include
first group second recessed portions which are positioned on the first circumference, and
second group second recessed portions which are positioned on the second circumference.

12. The roller according to claim 11,
wherein each of the first group first recessed portions and each of the second group first recessed portions are positioned in a circumferential direction of the roller so that portions thereof are overlapped each other.

13. A separation device comprising:
a feeding roller; and
a retard roller that forms a pair with the feeding roller, separates media other than a medium to be transported from a bundle of media, and returns the media to the upstream side thereof,
wherein the retard roller is the roller according to claim 12.

14. A separation device comprising:
a feeding roller; and
a retard roller that forms a pair with the feeding roller, separates media other than a medium to be transported from a bundle of media, and returns the media to the upstream side thereof,
wherein the retard roller is the roller according to claim 11.

15. An image reading apparatus comprising:
a reading portion that reads image information of a medium; and
a roller that is provided in a medium transport path which passes through a reading execution region of the reading portion and that applies a feeding force to the medium,
wherein the roller has a structure in which a contact surface between the roller and the medium is elastically crushed when the roller is pressed against the medium, and
wherein at least one of the rollers is the roller according to claim 11.

16. The roller according to claim 1,
wherein each of the first recessed portions and each of the second recessed portions have shapes in which peripheral direction components and radial direction components thereof are connected to each other in a side view of the roller in the shaft mounting direction.

17. A separation device comprising:
a feeding roller; and
a retard roller that forms a pair with the feeding roller, separates media other than a medium to be transported from a bundle of media, and returns the media to the upstream side thereof,
wherein the retard roller is the roller according to claim 16.

18. A separation device comprising:
a feeding roller; and
a retard roller that forms a pair with the feeding roller, separates media other than a medium to be transported from a bundle of media, and returns the media to the upstream side thereof,
wherein the retard roller is the roller according to claim 1.

19. An image reading apparatus comprising:
a reading portion that reads image information of a medium; and
a roller that is provided in a medium transport path which passes through a reading execution region of the reading portion and that applies a feeding force to the medium,
wherein the roller has a structure in which a contact surface between the roller and the medium is elastically crushed when the roller is pressed against the medium, and
wherein at least one of the rollers is the roller according to claim 1.

20. A recording apparatus comprising:
a recording portion; and
a roller that is provided in a medium transport path which passes through a recording execution region of the recording portion and that applies a feeding force to a medium,
wherein the roller has a structure in which a contact surface between the roller and the medium is elastically crushed when the roller is pressed against the medium, and
wherein at least one of the rollers is the roller according to claim 1.

* * * * *